(12) United States Patent
Coelho et al.

(10) Patent No.: US 8,893,156 B2
(45) Date of Patent: Nov. 18, 2014

(54) MONITORING OF DISTRIBUTED APPLICATIONS

(75) Inventors: Alexandre A. Coelho, Redmond, WA (US); Venkata Seshu Kumar Kurapati, Bellevue, WA (US); Ilarie G. Letca, Redmond, WA (US); Ashvinkumar J. Sanghvi, Issaquah, WA (US); Dhananjay M. Mahajan, Sammamish, WA (US); Rajeev Sudhakar, Seattle, WA (US); Anandha K. Ganesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 649 days.

(21) Appl. No.: 12/409,547

(22) Filed: Mar. 24, 2009

(65) Prior Publication Data

US 2010/0251263 A1 Sep. 30, 2010

(51) Int. Cl.
G06F 9/46 (2006.01)
G06F 9/54 (2006.01)
G06F 11/07 (2006.01)
G06F 11/34 (2006.01)

(52) U.S. Cl.
CPC .............. G06F 11/079 (2013.01); G06F 9/546 (2013.01); G06F 2209/542 (2013.01); G06F 11/0778 (2013.01); G06F 2201/81 (2013.01); G06F 2201/88 (2013.01); G06F 11/3404 (2013.01); G06F 11/3433 (2013.01); G06F 11/0748 (2013.01); G06F 2201/875 (2013.01); G06F 11/0709 (2013.01); G06F 2201/86 (2013.01); G06F 11/3466 (2013.01); G06F 2201/865 (2013.01)
USPC ............................. 719/318; 719/314; 718/102

(58) Field of Classification Search
None
See application file for complete search history.

(56) References Cited

U.S. PATENT DOCUMENTS 4,694,396 A * 9/1987 Weisshaar et al. ............. 719/313
5,832,515 A * 11/1998 Ledain et al. ....................... 1/1
5,938,749 A * 8/1999 Rusu et al. ...................... 710/54

(Continued)

FOREIGN PATENT DOCUMENTS

WO 2007015922 A2 2/2007
WO 2008119961 A1 9/2008

OTHER PUBLICATIONS

"International Search Report and Written Opinion" from the International Searching Authority (ISA/KR) for International Application No. PCT/US2010/028024, Date Mailed: Oct. 14, 2010, International Filing Date: Mar. 19, 2010, pp. 9.

(Continued)

Primary Examiner — Andy Ho
Assistant Examiner — Shih-Wei Kraft
(74) Attorney, Agent, or Firm — Jim Sfekas; Kate Drakos; Micky Minhas

(57) ABSTRACT

Methods, systems, and computer-readable media are disclosed for monitoring a distributed application. A particular method identifies a plurality of components of a distributed application. The method also identifies a specific technology associated with a particular component and attaches a technology specific interceptor to the particular component based on the identified specific technology. The method includes intercepting messages that are sent by or received by the particular component using the technology specific interceptor. At least one potential work item is generated based on the intercepted messages. The method includes determining whether to schedule the at least one potential work item for execution based on a predicted impact of the at least one work potential item on performance of the distributed application.

19 Claims, 12 Drawing Sheets

(56) References Cited

U.S. PATENT DOCUMENTS

| | | | |
|---|---|---|---|
| 6,182,136 B1* | 1/2001 | Ramanathan et al. | 709/224 |
| 6,279,001 B1 | 8/2001 | DeBettencourt et al. | |
| 6,457,142 B1* | 9/2002 | Klemm et al. | 714/38.12 |
| 6,460,055 B1* | 10/2002 | Midgley et al. | 707/640 |
| 6,535,878 B1* | 3/2003 | Guedalia et al. | 1/1 |
| 6,604,125 B1* | 8/2003 | Belkin | 718/104 |
| 6,611,955 B1 | 8/2003 | Logean et al. | |
| 6,748,555 B1 | 6/2004 | Teegan et al. | |
| 6,792,456 B1 | 9/2004 | Hellerstein et al. | |
| 6,792,466 B1 | 9/2004 | Saulpaugh et al. | |
| 7,155,728 B1* | 12/2006 | Prabhu et al. | 719/316 |
| 7,194,664 B1 | 3/2007 | Fung et al. | |
| 7,240,325 B2 | 7/2007 | Keller | |
| 7,891,000 B1* | 2/2011 | Rangamani et al. | 726/22 |
| 2002/0184363 A1* | 12/2002 | Viavant et al. | 709/224 |
| 2002/0194211 A1 | 12/2002 | Subramanian et al. | |
| 2003/0056199 A1* | 3/2003 | Li et al. | 717/127 |
| 2003/0061004 A1* | 3/2003 | Discenzo | 702/182 |
| 2003/0088609 A1* | 5/2003 | Guedalia et al. | 709/107 |
| 2003/0110339 A1* | 6/2003 | Calvignac et al. | 710/305 |
| 2003/0120980 A1* | 6/2003 | Harris | 714/45 |
| 2004/0003087 A1* | 1/2004 | Chambliss et al. | 709/226 |
| 2004/0025162 A1* | 2/2004 | Fisk | 718/105 |
| 2004/0030745 A1* | 2/2004 | Boucher et al. | 709/203 |
| 2004/0064577 A1* | 4/2004 | Dahlin et al. | 709/235 |
| 2004/0255048 A1* | 12/2004 | Lev Ran et al. | 709/249 |
| 2005/0172306 A1* | 8/2005 | Agarwal et al. | 719/328 |
| 2005/0267954 A1* | 12/2005 | Lewis et al. | 709/221 |
| 2006/0004767 A1 | 1/2006 | Diaconu et al. | |
| 2006/0015512 A1* | 1/2006 | Alon et al. | 707/100 |
| 2006/0085420 A1* | 4/2006 | Hwang | 707/10 |
| 2006/0085537 A1* | 4/2006 | Dickerson et al. | 709/224 |
| 2006/0107255 A1* | 5/2006 | Chagoly et al. | 717/127 |
| 2007/0038738 A1 | 2/2007 | Iyengar | |
| 2007/0083813 A1* | 4/2007 | Lui et al. | 715/709 |
| 2007/0118386 A1 | 5/2007 | Mueller et al. | |
| 2007/0162526 A1* | 7/2007 | Printezis et al. | 707/206 |
| 2007/0294696 A1* | 12/2007 | Papakipos et al. | 718/102 |
| 2008/0016115 A1 | 1/2008 | Bahl et al. | |
| 2008/0148242 A1 | 6/2008 | Cobb et al. | |
| 2008/0195718 A1* | 8/2008 | Hu et al. | 709/207 |
| 2008/0222697 A1 | 9/2008 | Birk et al. | |
| 2008/0235308 A1* | 9/2008 | Siegwart et al. | 707/206 |
| 2008/0235415 A1* | 9/2008 | Clark et al. | 710/105 |
| 2009/0049429 A1* | 2/2009 | Greifeneder et al. | 717/128 |
| 2009/0089785 A1* | 4/2009 | Marwinski et al. | 718/102 |
| 2009/0235325 A1 | 9/2009 | Dimitrakos et al. | |

OTHER PUBLICATIONS

Ghosh, et al. "A Test Management and Software Visualization Framework for Heterogeneous Distributed Applications", Retrieved at<<http://ieeexplore.ieee.org/stamp/stamp.jsp?arnumber=00966812>>, Proceedings of the 6th IEEE International Symposium on High Assurance Systems Engineering (HASE'01), pp. 11, Published 2001.

Choi, et al. "Design of Autonomic SLA Manager for Service Applications", Retrieved at<<http://ieeexplore.ieee.org/stamp/stamp.jsp?arnumber=04402092>>, IEEE International Conference on e-Business Engineering, pp. 8, Published 2007.

Kim et al. "LODIN: Load Distribution Mechanism in CORBA using Interceptor", Retrieved at<<http://ieeexplore.ieee.org/stamp.jsp?arnumber=00949551>>, pp. 17, Published 2001.

Ramnath Rajiv, WinResMon: A Tool for Discovering Software Dependencies, Configuration and Requirements in Microsoft Windows, 20th Large Installation System Administration Conference (LISA '06), pp. 175-186, Published 2006.

"SOA Operations Concepts Guide," Retrieved at <<http://www.actional.com/products/docs/Actional-SOA-Ops-Concepts.pdf>>, pp. 20, Published 2007.

Abraham Silberschatz, Peter B. Galvin, Greg Gagne; "Operating Systems Concepts, 8th Edition"; Jul. 29, 2008; John Wiley & Sons; XP002682360 ISBN: 0470128720; sections 3.1, 3.2, 4.4, 5.1, 5.2 and 5.3.

Extended European Search Report according to Rule 62 EPC received from the EPO dated Sep. 17, 2012, 10 pages.

Malu Castellanos et al.; "iBOM: A Platform for Intelligent Business Operation Management"; Proceedings of the 21st International Conference on Data Engineering (ICDE 2005); Dec. 31, 2005; 15 pages.

Decision on Rejection received from the State Intellectual Property Office of the Peoples's Republic of China, dated Oct. 31, 2013, 7 pages.

\* cited by examiner

MONITORING OF DISTRIBUTED APPLICATIONS

BACKGROUND

Software applications may be difficult to monitor when they are distributed across various physical components. Further, individual components may not be instrumented and different components may be under the jurisdiction of different enterprise operations teams. Applications may also include multiple technologies. Although distributed applications may be heterogeneous, monitoring systems for distributed applications are often technology-specific (e.g., a certain system can monitor Java application components but not .NET application components). In addition, monitoring systems may negatively impact the performance of the distributed application being monitored. That is, in an attempt to monitor every transaction at the distributed application, a monitoring system may introduce significant processing and memory overhead, disrupting the operation or noticeably affecting the performance of the distributed application. Such a performance impact may be problematic in real-time, near real-time, or mission-critical distributed applications.

SUMMARY

The present disclosure describes a monitoring system for distributed applications. Monitoring various hardware and software distributed application components, such as databases, servers, and web services, is supported. Monitoring multiple technologies, such as .NET, Java, Windows Communications Foundation (WCF), Internet Information Services (IIS), Windows-based technologies, and UNIX-based technologies is also supported.

The monitoring system includes a technology agnostic interceptor manager and one or more technology specific interceptors that are capable of intercepting messages sent by and received by components of the distributed application. Each of the technology specific interceptors is specific to a particular technology and is attached to a distributed application component that is associated with the particular technology (e.g., a .NET interceptor is attached to a distributed application component that includes .NET applications or services). The technology specific interceptors may be configured to track the invocation of a particular function, to track activity along a particular execution path of the distributed application, or to track events (e.g., software exceptions or reported errors) that occur in the distributed application. The technology specific interceptors generate work items based on the intercepted messages and send the work items to the technology agnostic interceptor manager.

The technology agnostic interceptor manager may schedule received work items for execution. For example, the technology agnostic interceptor manager may store discovered dependencies of the distributed application at a storage location, store activity information at the storage location, and report the occurrence of events to clients such as IT administrators or administrative applications. The technology agnostic interceptor manager may also include throttling capabilities, such as work item queuing, dependency caching, background threading, and garbage collection to reduce the performance impact of the monitoring system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
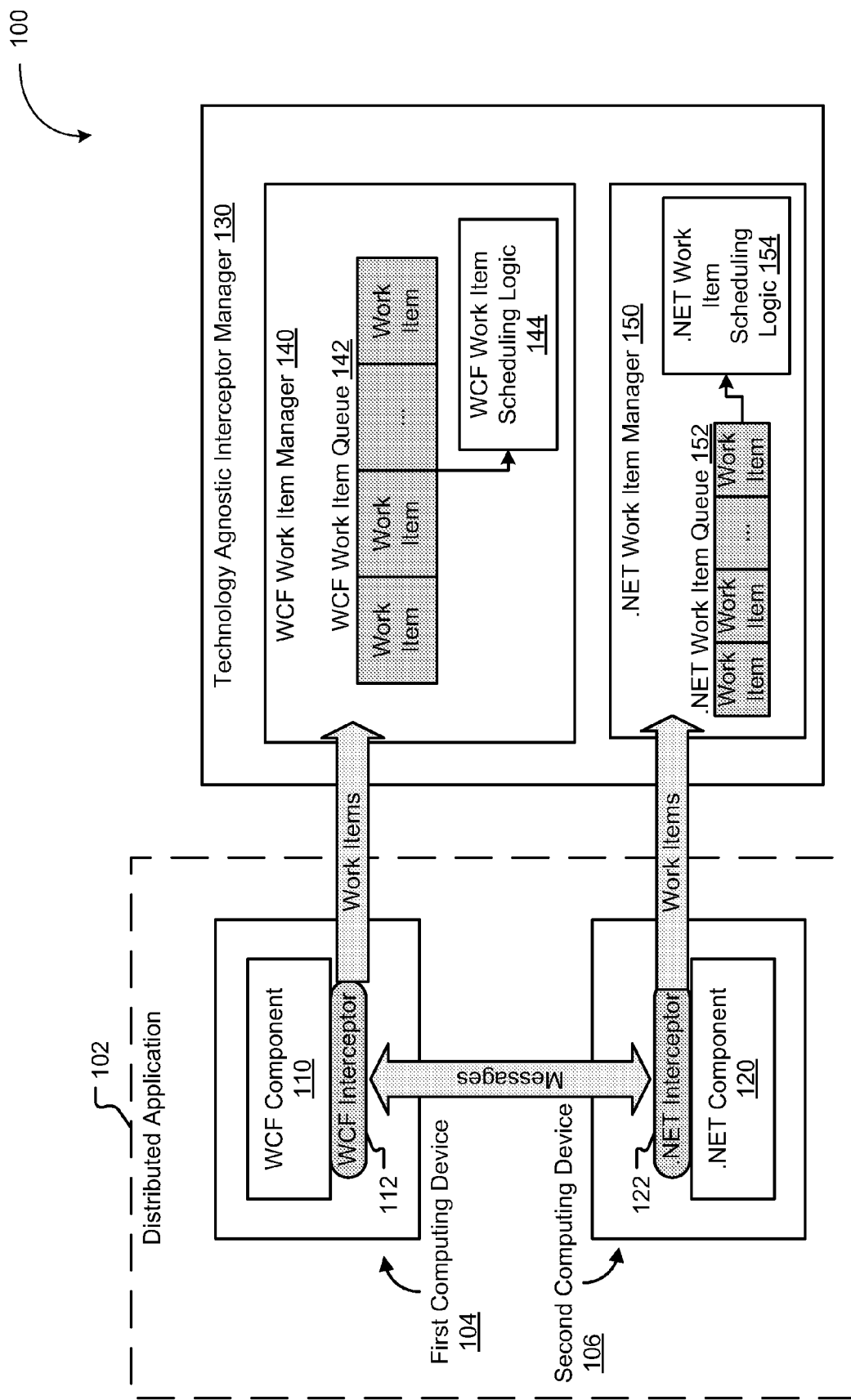
FIG. 1 is a block diagram of a particular embodiment of system of monitoring a distributed application.

In a particular embodiment, a method is disclosed that includes identifying a plurality of components of a distributed application and identifying a specific technology associated with a particular component of the plurality of components. The method also includes attaching a technology specific interceptor to the particular component based on the identified specific technology and intercepting messages that are sent or received by the particular component using the attached technology specific interceptor. The method further includes generating at least one potential work item based on the intercepted messages and determining whether to schedule the at least one potential work item for execution based on a predicted impact of the at least one potential work item on performance of the distributed application. In a particular embodiment, the at least one potential work item is an executable work item that is generated in response to determining that a particular instruction or set of instructions requires processing.

In another particular embodiment, a system is disclosed that includes a plurality of technology specific interceptors including a first technology specific interceptor and a second technology specific interceptor and a technology agnostic interceptor manager. The first technology specific interceptor is associated with a first technology and the second technology specific interceptor is associated with a second technology that is different from the first technology. The first technology specific interceptor is configured to track the operation of a first distributed application component associated with the first technology, including intercepting messages sent by and messages received by the first distributed application component. The first technology specific interceptor is further configured to generate work items based on the tracked operation of the first distributed application component and to send the work items to the technology agnostic interceptor manager. The second technology specific interceptor is configured to track the operation of a second distributed application component associated with the second technology, including intercepting messages sent by and messages received by the second distributed application component. The second technology specific interceptor is further configured to generate work items based on the tracked operation of the second distributed application component and to send the work items to the technology agnostic interceptor manager. The technology agnostic interceptor manager includes a plurality of work item managers, including a first work item manager associated with the first technology specific interceptor and a second work item manager associated with the second technology specific interceptor. Each work item manager is associated with particular technology specific interceptor and configured to receive work items from the particular technology specific interceptor and to queue the received work items in a work item queue. Each work item manager is further configured to compare an impact of a particular work item on performance of a distributed application component tracked by the particular technology specific interceptor to an acceptable performance impact threshold. Each work item manager is further configured to schedule the particular work item for execution when the impact is less than the acceptable performance impact threshold, and drop the particular work item without scheduling the particular work item for execution when the impact is greater than the acceptable performance impact threshold.

In another particular embodiment, a computer-readable medium is disclosed. The computer-readable medium includes instructions, that when executed by the computer, cause the computer to receive, at a technology agnostic interceptor manager, a first work item from a first technology specific interceptor attached to a first component of a distributed application. The first technology specific interceptor is specific to a first technology, and the first component is associated with the first technology. The computer-readable medium also includes instructions, that when executed by the computer, cause the computer to receive, at the technology agnostic interceptor manager, a second work item from a second technology specific interceptor attached to a second component of the distributed application. The second technology specific interceptor is specific to a second technology. The second component is associated with the second technology, and the second technology is different from the first technology. The computer-readable medium further includes instructions, that when executed by the computer, cause the computer to determine whether to schedule the first work item and the second work item for execution based on a first impact of the first work item on the distributed application and based on a second impact of the second work item on the distributed application.

FIG. 1 is a block diagram of a particular embodiment of a system 100 of monitoring a distributed application 102. The distributed application 102 includes components such as a Windows Communication Foundation (WCF) component 110 at a first computing device 104 and the .NET component 120 at a second computing device 106. The first computing device 104 and the second computing device 106 are distributed (e.g., operate using separate hardware or are located remotely from each other). The distributed application 102 also includes technology specific interceptors attached to the components, such as a WCF interceptor 112 attached to the WCF component 110 and the .NET interceptor 122 attached to the .NET component 120. The components of the distributed application 102 may be capable of sending and receiving messages and the technology specific interceptors attached to the components may be capable of intercepting the messages. The technology specific interceptors may also be capable of generating work items based on the intercepted messages and sending the generated work items to a technology agnostic interceptor manager 130.

Each component of the distributed application 102 may be configured to send messages to other components of the distributed application 102 and to receive messages from other components of the distributed application 102. For example, the WCF component 110 and the .NET component 120 may be configured to send messages to each other and receive messages from each other. In a particular embodiment, the messages are extensible markup language (XML) messages.

Each technology specific interceptor may be configured to track the invocation of a particular function at the component the technology specific interceptor is attached to. For example, the WCF interceptor 112 may be configured to track the invocation of a particular function at the WCF component 110. In a particular embodiment, the particular function includes a source operation and a target operation that are at different components of the distributed application 102. For example, the particular function may have a source operation at the WCF component 110 and a target operation at the .NET component 120. The WCF interceptor 112 may then discover a dependency between the source operation at the WCF component 110 and the target operation at the .NET component 120 by intercepting a message that indicates the invocation of the particular function.

Each technology specific interceptor may also be configured to monitor activity at a particular execution path of the distributed application 102 that includes the component that the technology specific interceptor is attached to. For example, the WCF interceptor 112 may intercept a message between the WCF component 110 and the .NET component 120 and determine that the intercepted message is representative of activity along a particular execution path that includes the WCF component 110.

Each technology specific interceptor may also be configured to track particular events (e.g., software exceptions or reported errors) occurring at the distributed application 102. In a particular embodiment, the particular event is tracked for a particular time period. For example, the WCF interceptor 112 may track a number of software exceptions that occur at the WCF component 110 for one minute, in order to calculate an exception per minute rate at the WCF component 110. Alternatively, the particular event may be tracked continuously. For example, the WCF interceptor 112 may intercept a message between the WCF component 110 and the .NET component 120 and determine from the intercepted message that a software exception (e.g., an event) has occurred at either the WCF component 110 or the .NET component 120.

Each technology specific interceptor may be configured to generate work items based on messages that are intercepted at the technology specific interceptor, and to send the generated work items to the technology agnostic interceptor manager 130. For example, the WCF interceptor 112 may generate a work item that includes instructions to store the discovered dependency between the source operation at the WCF component 110 and the target operation at the .NET component 120, and send the work item to the technology agnostic interceptor manager 130. As another example, the WCF interceptor 112 may generate a work item that includes instructions to store activity information related to the particular execution path that includes the WCF component 110 and to send the work item to the technology agnostic interceptor manager 130. As yet another example, the WCF interceptor 112 may generate a work item that includes instructions to report the occurrence of the software exception at either the WCF component 110 or the .NET component 120 and send the work item to the technology agnostic interceptor manager 130. The .NET interceptor 122 may similarly generate work items. Alternatively, the WCF interceptor 112 may generate a single work item that includes instructions for all three tasks.

It should be noted that multiple interceptors may also be attached to a single component. For example, a .NET interceptor such as the .NET interceptor 122 of FIG. 1 and a WCF interceptor such as the WCF interceptor 112 of FIG. 1 may both be attached to a web server of the distributed application 102 when the web server includes both .NET technology and WCF technology.

The technology agnostic interceptor manager 130 may be located at a web service of the distributed application 102 or at a management application of the distributed application 102. The technology agnostic interceptor manager 130 may include a plurality of work item managers, where each of the plurality of work item managers is configured to receive work items from a particular technology specific interceptor. For example, in the embodiment illustrated in FIG. 1, the technology agnostic interceptor manager includes a WCF work item manager 140 configured to receive work items from the WCF interceptor 112 and a .NET work item manager 150 configured to receive work items from the .NET interceptor 122. Each of the work item managers may also be configured to store the work items in a work item queue. For example, the WCF work item manager 142 may store work items in the WCF work item queue 142 and the .NET work item manager may store work items in the .NET work item queue 152. In a particular embodiment, work items are stored in work item queues in the order that the work items are received by the technology agnostic interceptor manager 130. For example, a first work item received from the WCF interceptor 112 may be stored in the WCF work item queue 142 before a second work item received from the WCF interceptor when the first work item is received by the technology agnostic interceptor manager 130 prior to the second work item. Each of the work item managers is also configured to drop a received work item when a work item queue is full. For example, the WCF work item manager 140 may drop a received work item when the WCF work item manager 140 determines that the WCF work item queue 142 is full (e.g., when the size of the WCF work item queue 142 equals a maximum work item queue size variable known to the WCF work item manager 140).

Each of the work item managers may include work item scheduling logic that is configured to schedule queued work items for execution. For example, the WCF work item manager 140 may include WCF work item scheduling logic 144 and the .NET work item manager 150 may include .NET work item scheduling logic 154. In a particular embodiment, the WCF work item scheduling logic 144 or the .NET work item scheduling logic 154 may determine whether or not to schedule a particular work item for execution based on a predicted impact of the particular work item on the performance of the distributed application 102. For example, the WCF work item scheduling logic 144 may schedule the particular work item for execution when the predicted impact of the particular work item is below an acceptable performance impact threshold (e.g., an acceptable processor utilization impact of 1%, an acceptable message latency impact of 1 second, or an acceptable execution queue length impact of three executable operations). Alternatively, the WCF work item scheduling logic 144 may determine whether to schedule a particular work item for execution based on a predicted impact of the particular work item on the WCF component 110.

In a particular embodiment, technology specific interceptors are configured to request empty work items from work item managers and to generate work items by storing information and execution instructions in the empty work items. It will be appreciated that in such an embodiment, a work item manager may reduce the performance impact of monitoring at a particular distributed application component by refusing a request for an empty work item. For example, upon discovering a dependency of the .NET component 120, the .NET interceptor 122 may request an empty work item from the .NET work item manager 150. If the .NET work item manager 150 grants the request and sends the empty work item to the .NET interceptor 122, the .NET interceptor 122 may generate a work item by storing the discovered dependency in the empty work item and send the generated work item to the .NET work item manager 150. In a particular embodiment, work items have an expiration time period and are dropped from a work item queue if they are not scheduled for execution within the expiration time period. For example, the work item generated by the .NET interceptor 122 may expire and may be dropped if it is not scheduled within 10 seconds of the empty work item being generated by the .NET work item manager 150.

In a particular embodiment, work item managers, such as the work item manager 140 and the work item manager 150, may be implemented in accordance with the following exemplary C# class template and interface:

```
public class WorkItemManager<T>
where T : class, IWorkItem, new( )
{
    public T RequestWorkItem( );
    public void QueueWorkItem(T workItem);
    public void ReturnWorkItem(T workItem);
}
public interface IWorkItem
{
    void Initialize( );
    void Setup( );
    void DoProcess( );
    void Cleanup( );
}
```

In operation, technology specific interceptors may be attached to components of the distributed application 102. For example, the WCF interceptor 112 may be attached to the WCF component 110, and the .NET interceptor 122 may be attached to the .NET component 120. Each technology specific interceptor may be configured to track function call invocations, to track activity information, to track performance events, or any combination thereof, at the distributed application 102. For example, the WCF interceptor 112 may be configured to track the invocation of a particular WCF function at the WCF component 110, to track activity information at a particular execution path of the distributed application 102 that includes the WCF component 110, and to track software exceptions occurring at the WCF component 110. Similarly, the .NET interceptor 122 may be configured to track the invocation of a particular .NET function at .NET component 120, to track activity information related to a particular execution path of the distributed application 102 that includes the .NET component 120, and to track software exceptions occurring at the .NET component 120.

During operation, the technology specific interceptors may intercept one or more messages between various components of the distributed application 102 and may generate work items based on the one or more intercepted messages. The technology specific interceptors may also send the generated work items to the technology agnostic interceptor manager 130. For example, the WCF interceptor 112 may intercept a message sent by the WCF component 110 to the .NET component 120, generate a work item based on the intercepted message, and send the work item to the technology agnostic interceptor manager 130. In a particular embodiment, the intercepted message is indicative of a dependency between a source operation at the WCF component 110 and a target operation at the .NET component 120, and the work item includes instructions to store the dependency. In another particular embodiment, the intercepted message includes activity information related to an execution path of the distributed application 102 that the WCF interceptor 112 is configured to track, and the work item includes instructions to store the activity information. In another particular embodiment, the intercepted message indicates that a software exception has occurred at either WCF component 110 or the .NET component 120, and the work item includes instructions to report the occurrence of the software exception.

When the technology agnostic interceptor manager 130 receives a work item form a technology specific interceptor, a work item manager (e.g., the WCF work item manager 140 or the .NET work item manager 150) may add the received work item to the a item queue (e.g., the WCF work item queue 142 or the .NET work item queue 152).

For each potential work item in the WCF work item queue 142, the WCF work item scheduling logic 144 may determine whether or not to schedule the potential work item for execution based on a predicted impact of the potential work item on the performance of the distributed application 102. When the predicted impact of the potential work item is below an acceptable performance impact threshold, the WCF work item scheduling logic 144 may schedule the potential work item for execution. For example, the potential work item may be scheduled when the predicted impact of the potential work item on message latency at the distributed application 102 is less than 1 second. When the potential impact of the particular work item is above the acceptable performance impact threshold, the WCF work item scheduling logic 144 may drop the potential work item from the WCF work item queue 142. For example, the potential work item may be dropped when the predicted impact of the potential work item on message latency at the distributed application is more than 1 second. Similarly, for each potential work item in the .NET work item queue 152, the .NET work item scheduling logic may selectively schedule the potential work item based on a predicted impact of the potential work item on the performance of the distributed application 102.

It will be appreciated that the system 100 of FIG. 1 may be used to monitor a distributed application that is distributed across various components and that includes various technologies. It will further be appreciated that the system 100 of FIG. 1 includes throttling capabilities (e.g., refusing requests for empty work items, limiting the size of work item queues, dropping work items that have a high predicted impact on performance, and having work items automatically expire after an expiration time period) to reduce the overall performance impact of such monitoring on the distributed application. It will therefore be appreciated that the system 100 of FIG. 1 may sacrifice monitoring accuracy for performance as needed, so that the operation of real-time, near real-time, or mission-critical distributed applications is not disrupted by the system 100 of FIG. 1.

Figure 2:
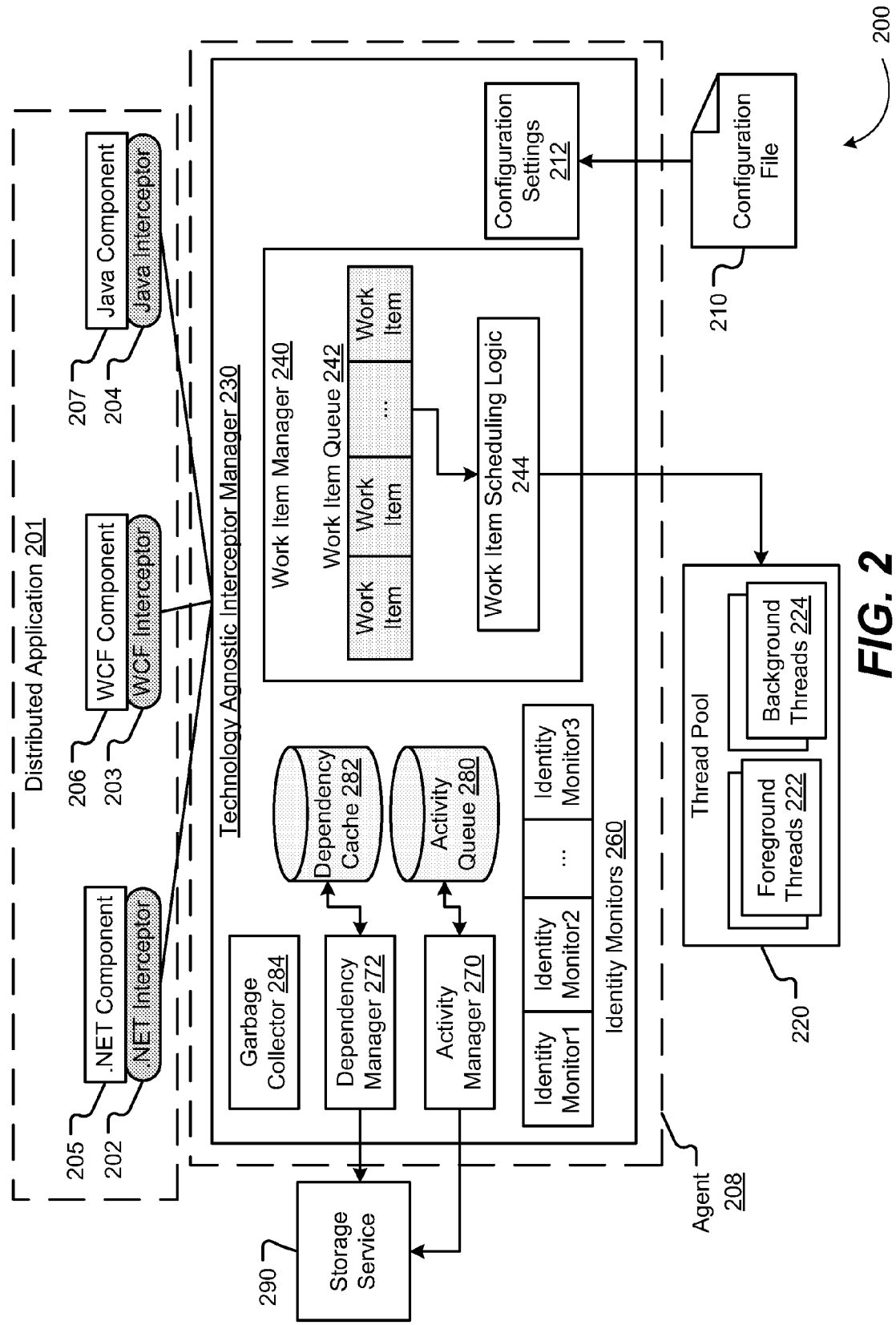
FIG. 2 is a block diagram of another particular embodiment of a system of monitoring a distributed application.

FIG. 2 is a block diagram of another particular embodiment of a system 200 of monitoring a distributed application 201. The distributed application 201 includes a plurality of technology specific interceptors, such as a .NET interceptor 202 attached to a .NET component 205, a WCF interceptor 203 attached to a WCF component 206, and a Java interceptor 204 attached to the a Java component 207. Each technology specific interceptor may be configured to send work items to a technology agnostic interceptor manager 230. In an illustrative embodiment, the .NET interceptor 202 includes the .NET interceptor 122 of FIG. 1, the WCF interceptor 203 includes the WCF interceptor 112 of FIG. 1, and the technology agnostic interceptor manager 230 includes the technology agnostic interceptor manager 130 of FIG. 1.

The work items generated by the technology specific interceptors and sent to the technology agnostic interceptor manager 230 may include instructions to store a discovered dependency of the distributed application 201, to store activity information related to a particular execution path of the distributed application 201, to report an event that has occurred at the distributed application 201, or any combination thereof. The technology agnostic interceptor manager 230 may include a plurality of work item managers, such as the work item manager 240, where each work item manager is configured to store work items received from a particular technology specific interceptor in a work item queue, such as the work item queue 242. For example, the work item manager 240 may be a .NET work item manager and store work items received from the .NET interceptor 202 in the work item queue 242. As another example, the work item manager 240 may be a WCF work item manager and store work items received from the WCF interceptor 203 in the work item queue 242. As another example, the work item manager 240 may be a Java work item manager and store work items received from the Java interceptor 204 in the work item queue 242.

The work item manager 240 may also include work item scheduling logic 244 that is configured to schedule work items in the work item queue 242 for execution and to remove work items from the work item queue 242 once they are scheduled for execution. In a particular embodiment, the work item scheduling logic 244 determines whether or not to schedule a particular work item for execution based on a predicted impact of the particular work item on the performance of the distributed application 201. For example, the work item scheduling logic 244 may schedule the particular work item for execution when the predicted impact of the particular work item is below an acceptable performance impact threshold.

The work item scheduling logic 244 may have access to a thread pool 220, where the thread pool 220 includes one or more foreground threads 222 and one or more background threads 224. When the work item scheduling logic 244 has access to the thread pool 220, the work item scheduling logic 244 may schedule work items for execution in one of the foreground threads 222 or one of the background threads 224 of the thread pool 220. The work item scheduling logic 244 may also be configured to limit the number of concurrently executing work items and to limit the number of concurrently executing threads of the thread pool 220.

A dependency manager 272 at the technology agnostic interceptor manager 230 may be configured to execute work items that include instructions to store discovered dependencies. In a particular embodiment, the dependency manager 272 temporarily collects discovered dependencies in a dependency cache 282 and stores the collected dependencies in batches. For example, the dependency manager 272 may collect discovered dependencies in the dependency cache 282 and store the collected discovered dependencies from the dependency cache 282 each time the size of the dependency cache 282 reaches a fixed batch size (e.g., 20). Alternatively, the dependency manager 272 may collect discovered dependencies in the dependency cache 282 and store the collected discovered dependencies from the dependency cache 282 at a fixed time interval (e.g., 120 seconds). The dependencies collected by the dependency cache 282 may expire if they are not stored within an expiration time period. The dependency manager 272 may store a batch of discovered dependencies by sending the batch of discovered dependencies to a storage service 290 that is responsible for storing items at one or more storage locations. For example, the storage service 290 may store discovered dependencies in a database or some other data store. In a particular embodiment, the storage service 290 may store a particular dependency in response to determining that the particular dependency has not previously been stored. The dependency manager 272 may also be configured to turn on or turn off dependency discovery at each individual technology specific interceptor of the distributed application 201. For example, the dependency manager 272 may turn on or turn off dependency discovery at each of the .NET interceptor 202, the WCF interceptor 203, and the Java interceptor 204.

An activity manager 270 at the technology agnostic interceptor manager 230 may be configured to execute work items that include instructions to store activity information related to a particular execution path of the distributed application 201. In a particular embodiment, the activity manager 270 queues such work items in an activity queue 280 and drops such work items that are received when the activity queue 280 is full. The activity manager 270 may store activity information by transferring the activity information from the activity queue 280 to the storage service 290. In a particular embodiment, the activity manager 270 is configured to initialize activity information collection at a particular technology specific interceptor. For example, when the Java component 207 interfaces with a database via Java Database Connectivity (JDBC), the activity manager 270 may track database operations by instructing the Java interceptor 204 to track all messages at the Java component 207 that include JDBC calls.

It should be noted that although the particular embodiment illustrated in FIG. 2 shows only one storage service (i.e., the storage service 290), multiple storage services may be accessible by the technology agnostic interceptor manager 230. For example, the dependency manager 272 may use a first storage service to store discovered dependencies, and the activity manager 270 may use a second storage service to store activity information. The first storage service and the second storage service may store data to the same storage locations or to different storage locations.

The identity monitors 260 at the technology agnostic interceptor manager 230 may include an identity monitor for each component of the distributed application 201. For example, the identity monitors 260 may include an endpoint monitor for a web service of the distributed application 201. In a particular embodiment, the identity monitor for a particular component stores data related to events (e.g., software exceptions or errors) that are detected by technology specific interceptors attached to the particular component. Each identity monitor may have one or more clients, and each identity monitor may execute a work item that includes instructions to report the occurrence of a particular event by reporting the occurrence of the particular event to the one or more clients. For example, when the .NET interceptor 202 generates a work item that includes instructions to report an error at the .NET component 205, the identity monitor for the .NET component 205 may execute the work item by reporting the error to a client of the identity monitor for the .NET component 205. Each identity monitor may store event data in a monitoring tree that includes allocated monitors, such as component monitors, endpoint monitors, activity monitors, business perspective monitors, operation call monitors, instrument monitors, or any combination thereof. Monitoring trees are further described herein with reference to FIG. 3. The technology agnostic interceptor manager 230 may also include a garbage collector 284. The garbage collector 284 may be configured to run at a fixed time interval and deallocate monitors that have not been used during the fixed time interval.

In a particular embodiment, the technology agnostic interceptor manager 230 includes one or more configuration settings 212. The configuration settings 212 may be set via a configuration file 210. The configuration 210 file may be stored in any format (e.g., XML) and may include settings for the dependency manager 272, the activity manager 270, the work item manager 240, and the garbage collector 284. For example, the configuration file 210 may be stored in XML and include the following exemplary XML section:

```
<interceptorManagerConfiguration>
    <dependencyManager
        storageClient="DependencyStorageClient"
        submitBatchSize="2"
        submitFrequency="20"
        cacheExpiration="60"/>
    <workItemManager
        maxWorkItemQueueSize="40000"
        maxWorkItemThreads="2"
        requestedWorkItemExpiration="20"/>
    <activityManager storageClient="ActivityStorageClient"/>
    <garbageCollector
        frequency="60"/>
</interceptorManagerConfiguration>
```

In a particular embodiment, the technology specific interceptors may be implemented in accordance with the following exemplary C# interfaces:

```
public interface IInterceptorService
{
    boot ProcessDependencyDiscovery(bool turnOn);
    boot ProcessActivityMonitoring(bool turnOn);
    Guid SetupInstrument(
        string address,
        string action,
        string bpXPath,
        string bpNamespace,
        string counterName,
        string counterConfig,
        int instrumentInterval);
    Guid SetupOperationCallInstrument(
        string sourceAddress,
        string sourceAction,
        string targetAddress,
        string targetAction,
        string bpXPath,
        string bpNamespace,
        string counterName,
        string counterConfig,
        int instrumentInterval);
    Guid SetupActivityInstrument(
        string address,
        string action,
```

```
        string bpXPath,
        string bpNamespace,
        string counterName,
        string counterConfig,
        int instrumentInterval);
    InstrumentData[ ] GetInstruments(Guid[ ] ids);
}
public enum InstrumentDataState
{
    InstrumentNotFound,
    InstrumentDataValid,
    IntrumentProcessingError
}
public class InstrumentData
{
    public InstrumentDataState State { get; }
    public double Value { get; }
    public InstrumentValueState ValueState { get; }
    public DateTime WindowStart { get; }
    public DateTime WindowEnd { get; }
}
public enum InstrumentValueState
{
    NotSet,
    WindowSet,
    Set,
    SetWithOverflow
}
```

It will be appreciated that when a technology specific interceptor is implemented as above, dependency discovery at the technology specific interceptor may be turned on or off by calling the method ProcessDependencyDiscovery( ) and activity monitoring may be turned on or off by the method ProcessActivityMonitoring( ). Furthermore, event tracking may be set up by the method SetupInstrument( ), function invocation tracking may be set up by the method SetupOperationCallInstrument( ), and activity tracking may be set up by the method SetupActivityInstrument( ).

In a particular embodiment, the technology agnostic interceptor manager 230 may be located at an agent 208 that is external to the distributed application 201. In such an embodiment, technology specific interceptors at the distributed application, such as the technology specific interceptors 202-204, may be configured to track function calls, to track activity information, and to track events by the external agent 208.

In operation, the technology agnostic interceptor manager 230 may be configured via the configuration file 210. The technology agnostic interceptor manager 230 may identify components of the distributed application 201, such as the .NET component 205, the WCF component 206, and the Java component 207. The technology agnostic interceptor manager 230 may further identify a specific technology associated with one or more of the components and attach a technology specific interceptor to the one or more components. For example, the technology agnostic interceptor manager 230 may attach the .NET interceptor 202 to the .NET component 205, attach the WCF interceptor 203 to the WCF component 206, and attach the Java interceptor 204 to the Java interceptor 207. The technology agnostic interceptor manager 230 may configure the technology specific interceptors to discover dependencies, track activity information, and track events in the distributed application 201. For example, the dependency manager 272 may turn on dependency discovery at the .NET interceptor 202 and configure the .NET interceptor 202 to track the invocation of a particular .NET function at the .NET component 205. As another example, the activity manager 270 may instruct the Java component 204 to track JDBC calls between the Java component 207 and a database. As yet another example, the technology agnostic interceptor manager 230 may configure the WCF interceptor 203 to report each occurrence of a software exception at the WCF component 206.

The technology specific interceptors may intercept one or more messages between the various components of the distributed application 201 and may generate one or more work items based on the one or more intercepted messages. For example, the .NET interceptor 202 may intercept a message related to an invocation of a particular .NET function and discover a dependency between a source operation at the WCF component 206 and a target operation at the .NET component 205. The .NET interceptor 202 may send a related dependency work item to the technology agnostic interceptor manager 230. As another example, the Java interceptor 204 may detect that the Java component 207 has made a JDBC call and send a related activity work item to the technology agnostic interceptor manager 230. As yet another example, the WCF interceptor 203 may detect the occurrence of a software exception at the WCF component 206 and send a related event work item to the technology agnostic interceptor manager 230.

When the technology agnostic interceptor manager 230 receives the dependency work item from the .NET interceptor 202, a .NET work item manager (e.g. the work item manager 240 when the work item manager 240 is a .NET work item manager) may add the dependency work item to a work item queue (e.g., the work item queue 242 when the work item manager 240 is a .NET work item manager). Work item scheduling logic at the work item manager (e.g., the work item scheduling logic 244 when the work item manager 240 is a .NET work item manager) may determine whether or not to schedule the dependency work item for execution based on a predicted impact of the dependency work item on the performance of the distributed application 201. When the predicted impact of the dependency work item is below an acceptable performance impact threshold, the work item scheduling logic 244 may schedule the dependency work item for execution in one of the foreground threads 222 or background threads 224 of the thread pool 220. The dependency manager 272 may execute the dependency work item by adding the discovered dependency between the source operation at the WCF component 206 and the target operation at the .NET component 205 to the dependency cache 282. Subsequent to adding the discovered dependency to the dependency cache 282, the dependency manager 272 may store the discovered dependency via the storage service 290. Alternatively, when the predicted impact of the dependency work item is above the acceptable performance impact threshold, the dependency work item may be dropped.

When the technology agnostic interceptor manager 230 receives the activity work item from the Java interceptor 204, a Java work item manager (e.g., the work item manager 240 when the work item manager 240 is a Java work item manager) may add the activity work item to a work item queue (e.g., the work item queue 242 when the work item manager 240 is a Java work item manager). Work item scheduling logic at the work item manager (e.g., the work item scheduling logic 244 when the work item manager 240 is a Java work item manager) may determine whether or not to schedule the activity work item for execution based on a predicted impact of the activity work item on the performance of the distributed application 201. When the predicted impact of the activity work item is below an acceptable performance impact threshold, the work item scheduling logic 244 may schedule the activity work item for execution in one of the foreground threads 222 or background threads 244 of the thread pool 220. The activity manager 270 may execute the activity work item by adding the JDBC call made by the Java component 207 to the activity queue 280. Subsequent to adding the JDBC call to the activity queue 280, the activity manager 270 may store the JDBC call via the storage service 290. Alternatively, when the predicted impact of the activity work item is above the acceptable performance impact threshold, the activity work item may be dropped.

When the technology agnostic interceptor manager 230 receives the event work item from the WCF interceptor 203, a WCF work item manager (e.g., the work item manager 240 when the work item manager 240 is a WCF work item manager) may add the event work item to a work item queue (e.g., the work item queue 242 when the work item manager 240 is a WCF work item manager). Work item scheduling logic at the work item manager (e.g., the work item scheduling logic 244 when the work item manager 240 is a WCF work item manager) may determine whether or not to schedule the event work item for execution based on a predicted impact of the event work item on the performance of the distributed application 201. When the predicted impact of the event work item is below an acceptable performance impact threshold, the work item scheduling logic 244 may schedule the event work item for execution in one of the foreground threads 222 or background threads 244 of the thread pool 220. An identity monitor (e.g., one of the identity monitors 260) for the WCF component 206 may then execute the event work item by reporting the software exception to one or more clients of the identity monitor for the WCF component 206. Alternatively, when the predicted impact of the event work item is above the acceptable performance impact threshold, the event work item may be dropped.

It will be appreciated that the system 200 of FIG. 2 includes throttling capabilities to reduce the overall performance impact of monitoring the distributed application 201. For example, the dependency manager 272 may reduce the number of dependency storage operations, each of which may be time-consuming, by caching discovered dependencies in the dependency cache 282 and storing discovered dependencies in batches. The activity manager 270 may reduce the performance impact of activity storage operations by queuing activity information in the activity queue 280 and storing the queued activity information at a time when the distributed application 201 is relatively idle (e.g., at nights or during weekends). The garbage collector 284 may reduce the memory footprint of the system 200 of FIG. 2 by deallocating monitors that are no longer in use. The work item scheduling logic 244 may limit the number of concurrently executing work items. The work item scheduling logic 244 may also schedule work items for execution in a background thread of the thread pool 220 that has a lower priority than other threads of the distributed application 201. That is, the background thread will not interrupt other executing threads to execute the scheduled work items.

Figure 3:
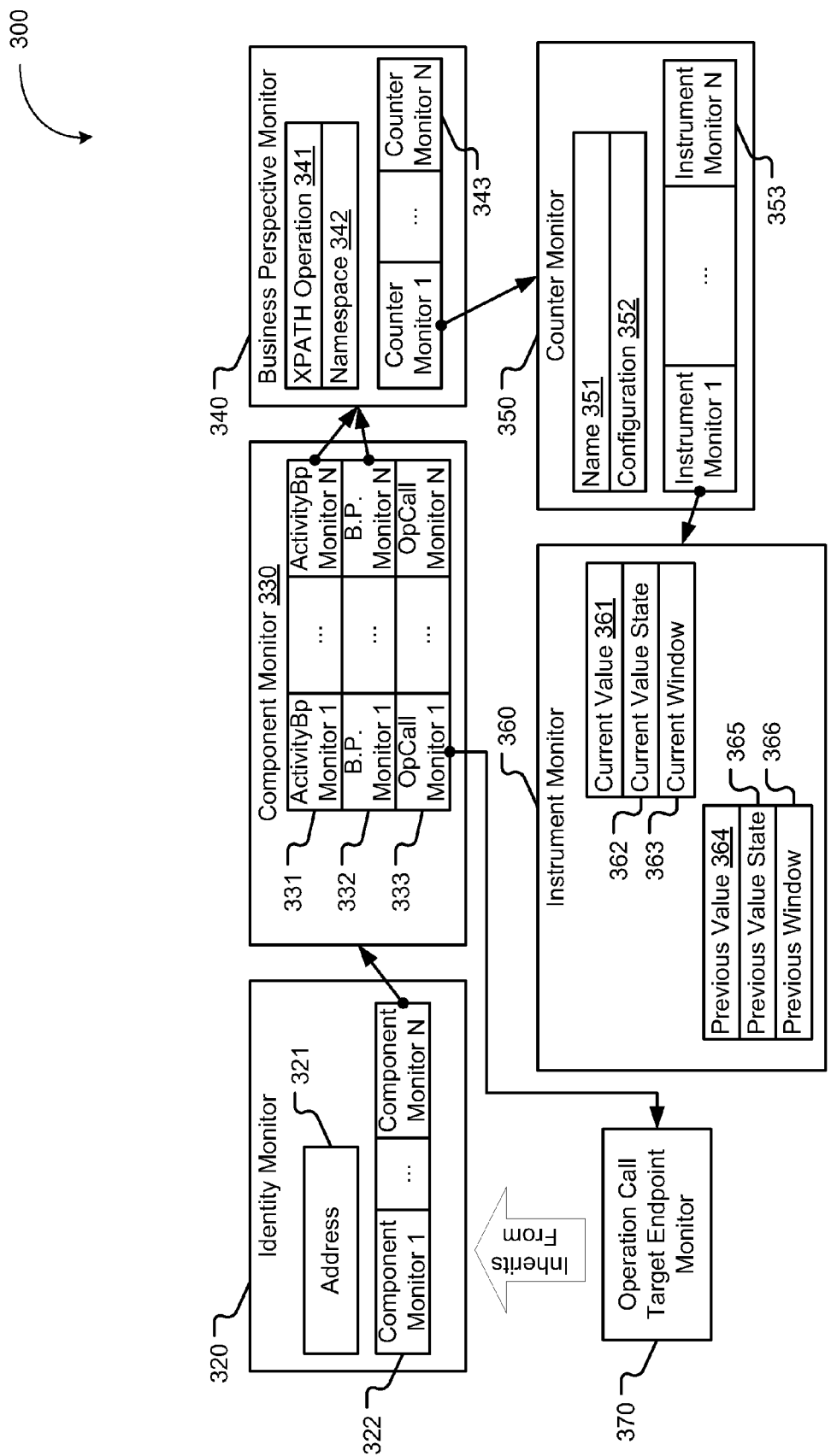
FIG. 3 is a block diagram of a particular embodiment of an identity monitor that may be used in conjunction with a system of monitoring a distributed application.

FIG. 3 is a block diagram 300 of a particular embodiment of an identity monitor 320 that may be used in conjunction with a system of monitoring a distributed application, such as the system 100 of FIG. 1 or the system 200 of FIG. 2. The identity monitor 320 may be a root of a monitoring tree that includes one or more component monitors 322 such as the component monitor 330. The monitoring tree may also include one or more instances of a business perspective monitor 340, an operation call target endpoint monitor 370, a counter monitor 350, and an instrument monitor 360. In an illustrative embodiment the identity monitor 320 is one of the identity monitors 260 of FIG. 2.

The identity monitor 320 may be associated with a particular component of a distributed application. For example, the identity monitor may 320 be associated with the one of the components 110 or 120 of FIG. 1, or the components 205, 206, or 207 of FIG. 2. The identity monitor 320 may include an address 321 of the component the identity monitor 320 is associated with. The address 321 may be an Internet protocol (IP) address or any other address. For example, the identity monitor 320 may include an IP address of the .NET component 120 of FIG. 1. The identity monitor 320 may also include one or more component monitors 322, such as the component monitor 330.

The component monitor 330 may include one or more activity business perspective monitors 331 and one or more business perspective monitors 332, such as the business perspective monitor 340. The component monitor 330 may also include one or more operation call monitors 333, such as the operation call target endpoint monitor 370.

Each business perspective monitor, such as the business perspective monitor 340, may store counter and instrument data for a particular business perspective, i.e. a particular message source. For example, the business perspective monitor 340 may store counter and instrument data generated by tracking messages sent to the .NET component 120 of FIG. 1 from the WCF component 110 of FIG. 1. When the messages are XML messages, the business perspective monitor 340 may include an XML Path Language (XPATH) operation 341 that is executable on a message to identify the particular message source. The business perspective monitor 340 may also include a namespace 342 that is associated with the particular message source. The business perspective monitor 340 may also include one or more counter monitors 343, such as the counter monitor 350.

The counter monitor 350 may track the occurrence of a particular event at the distributed application. The counter monitor 350 may include a name 351 of a counter that tracks the particular event and a configuration 352 associated with the counter. For example, the counter monitor 350 may track exceptions that occur at the .NET component 205 of FIG. 2 and are caused by the WCF component 206 of FIG. 2 and include the name 351 "WCF→.NET Exception Counter". The counter monitor 350 may also include one or more instrument monitors 353, such as the instrument monitor 360.

Each instrument monitor, such as the instrument monitor 360, may be configured to store the value of a particular counter at a particular point in time. For example, the instrument monitor 360 may be configured to store the value of the "WCF→.NET Exception Counter" at a particular point in time. In a particular embodiment, the instrument monitor 360 includes a current value 361 of the particular counter, a current value state 362 of the particular counter, and a current window 363 associated with the particular counter. The instrument monitor 360 may also include a previous value 364, a previous value state 365, and a previous window 366. The current value state 362 and the previous value state 365 may include a state indicating that the particular counter has not been initialized, a state indicating that the particular counter has been initialized but has not been read, a state indicating that the particular counter contains a valid value, or a state indicating that the particular counter contains an imprecise value due to an overflow. In a particular embodiment, a new instrument monitor is allocated each time the value of the particular counter changes.

The operation call target endpoint monitor 370 may be configured to store data related to a particular operation call (e.g., function call). In a particular embodiment, the operation call is internal to a component of the distributed application. For example, the operation call may be an internal function call at the .NET component 120 of FIG. 1. Alternatively, the operation call may be an operation call between two components of the distributed application. For example, the operation call may be a function call that has a source operation at the WCF component 110 of FIG. 1 and a target operation at the .NET component 120 of FIG. 1. In a particular embodiment, the operation call target endpoint monitor 370 is an object of a software class that inherits from a software class corresponding to the endpoint monitor 320, such that each operation call target endpoint monitor includes features of the endpoint monitor 320, such as the endpoint address 321 and the one or more operation monitors 322.

It should be noted that the particular monitoring tree illustrated FIG. 3 is specific to WCF technology. The monitoring tree may include a different hierarchy of monitors for different technologies.

It will be appreciated that the monitoring tree of FIG. 3 may be used to organize the data from work items that are generated by technology specific interceptors, speeding the retrieval of such data. For example, the data from a particular intercepted message may be organized by operation, by business perspective, or by counter. When the intercepted message indicates an operation call, the data may also be organized by operation call.

Figure 4:
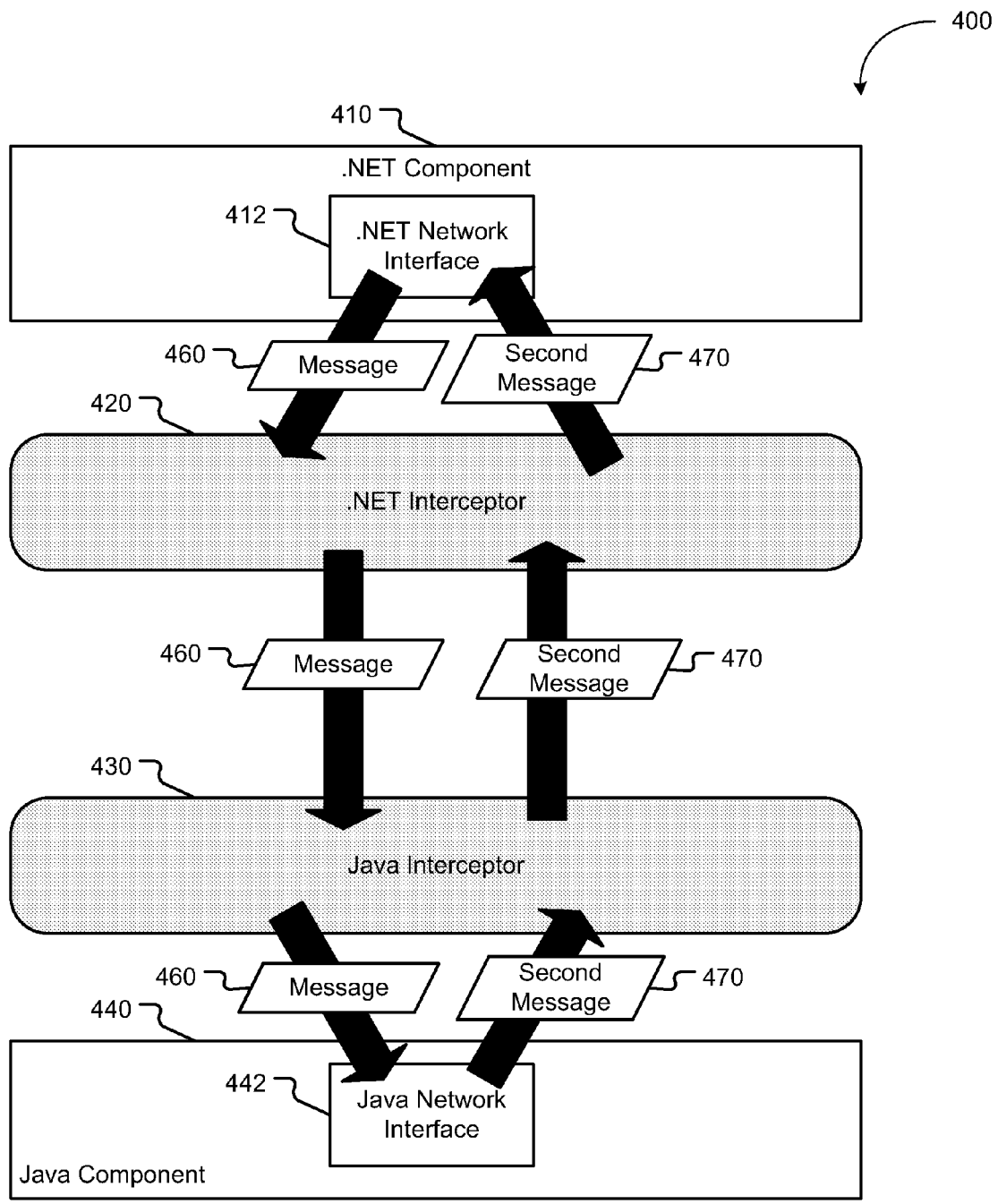
FIG. 4 is a block diagram to illustrate message interception to monitor a distributed application.

FIG. 4 is a block diagram 400 to illustrate message interception to monitor a distributed application (e.g., the distributed application 102 of FIG. 1 or the distributed application 201 of FIG. 2). In the particular embodiment illustrated in FIG. 4, messages are intercepted between a .NET component 410 and a Java component 440. The messages are intercepted at a .NET interceptor 420 attached to the .NET component 410 and at a Java interceptor 430 attached to the Java component 440. In an illustrative embodiment, the .NET component 410 includes the .NET component 110 of FIG. 1 or the .NET component 205 of FIG. 2, and the Java component 440 includes the Java component 207 of FIG. 2.

The .NET interceptor 420 may be attached to the .NET component 410 so that all incoming and outgoing messages at the .NET component 410 pass through the .NET interceptor 420. For example, the .NET interceptor 420 may be attached at a .NET network interface 412 of the .NET component 410. The incoming and outgoing messages at the .NET component 410 may be XML messages or may be in any other message format.

Similarly, the Java interceptor 430 may be attached to the Java component 440 so that all incoming and outgoing messages at the Java component 440 pass through the Java interceptor 430. For example, the Java interceptor 430 may be attached to a Java network interface 442 of the Java component 440. The incoming and outgoing messages at the Java component 440 may be XML messages or may be in any other message format.

In operation, the .NET component 410 may send a message 460 to the Java component 440. The message 460 may leave the .NET component 410 at the .NET network interface 412 and may be intercepted by the .NET interceptor 420 attached to the .NET network interface 412. Upon intercepting the message 460, the .NET interceptor 420 may examine the message 460, in an attempt to discover a dependency of the .NET component 410, to track activity information at a particular execution path that includes the .NET component 410, or to track occurrences of a particular event at the .NET component 410. After examining the intercepted message 460, the .NET interceptor 420 may send the intercepted message 460 to the Java component 440.

Prior to arriving at the Java component 440, the message 460 may once again be intercepted, this time by the Java interceptor 430. The Java interceptor 430 may perform similar operations on the intercepted message 460 as described above with reference to the .NET interceptor 420. For example, the Java interceptor 430 may also examine the message 460 in an attempt to discover a dependency of the Java component 440, to track activity information at a particular execution path that includes the Java component 440, or to track occurrences of a particular event at the Java component 440.

It should be noted that messages sent in either direction may be intercepted and examined. For example, a second message 470 sent from the Java component 440 to the .NET component 410 may also be intercepted and examined to discover dependencies, to track activity information, and to track event occurrences. It should also be noted that although the particular embodiment illustrated in FIG. 4 shows an interceptor attached to both components, a dependency may be discovered between two components even when only one interceptor is present in a message path between the two components. For example, when the Java interceptor 430 is not present, the dependency between the .NET component 410 and the Java component 440 may nonetheless be discovered by the .NET interceptor 420. Similarly, when the .NET interceptor 420 is not present, the dependency between the .NET component 410 and the Java component 440 may nonetheless be discovered by the Java interceptor 430.

It will be appreciated that message interception, as illustrated in FIG. 4, may be used to monitor components of a distributed application that are associated with different technologies (e.g., .NET and Java).

Figure 5:
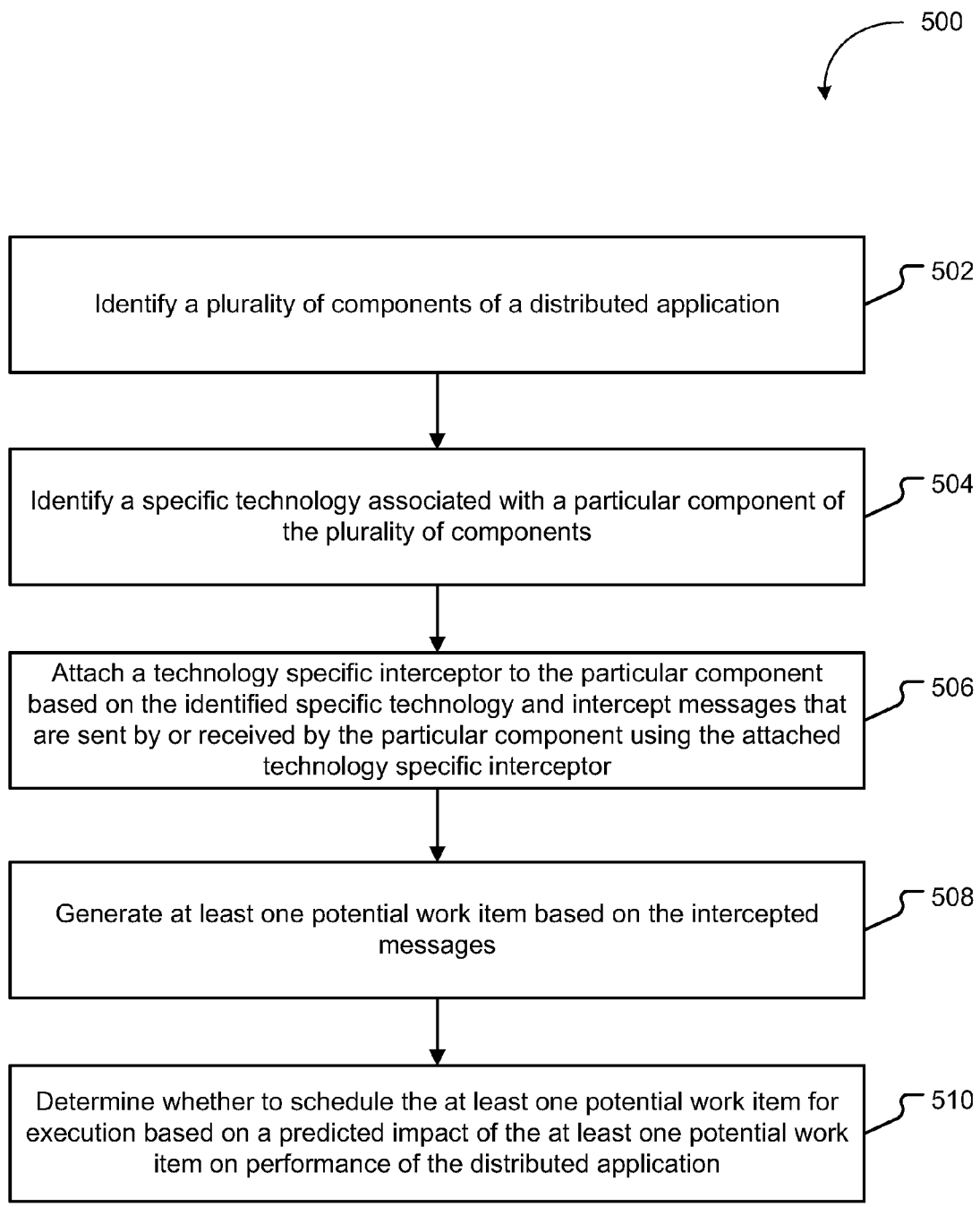
FIG. 5 is a flow diagram of a particular embodiment of a method of monitoring a distributed application.

FIG. 5 is a flow diagram of a particular embodiment of a method 500 of monitoring a distributed application. In an illustrative embodiment, the method 500 may be performed by the system 100 of FIG. 1 or the system 200 of FIG. 2. The method 500 includes identifying a plurality of components of a distributed application, at 502. For example, in FIG. 1, the technology agnostic interceptor manager 130 may identify the WCF component 110 and the .NET component 120. The method 500 also includes identifying a specific technology associated with a particular component of the plurality of components, at 504. For example, in FIG. 1, the technology agnostic interceptor manager 130 may identify that the WCF component 110 is associated with WCF technology.

The method 500 further includes attaching a technology specific interceptor to the particular component based on the identified specific technology and intercepting messages that are sent by or received by the particular component using the attached technology specific interceptor, at 506. For example, in FIG. 1, the technology interceptor manager 130 may attach the WCF interceptor 112 to the WCF component 110, and the WCF interceptor 112 may intercept messages sent by or received by the WCF component 110. The method 500 also includes generating at least one potential work item based on the intercepted messages, at 508. For example, in FIG. 1, the WCF interceptor 112 may generate at least one potential work item based on the intercepted messages.

The method 500 also includes determining whether to schedule the at least one potential work item, at 510. The determination is made based on a predicted impact of the at least one potential work item on performance of the distributed application. For example, in FIG. 1, the WCF work item scheduling logic 144 may determine whether to schedule the at least one potential work item based on a predicted impact of the at least one potential work item on the performance of the distributed application 102.

It will be appreciated that the method 500 of FIG. 5 may be used to monitor a distributed application that is distributed across various components and that includes various technologies. It will further be appreciated that the method 500 of FIG. 5 may reduce the overall performance impact of such monitoring by not scheduling work items that have a high predicted impact on the performance of the distributed application. For example, the method 500 of FIG. 5 may reduce the overall performance impact of such monitoring by limiting the number of queued work items. It will therefore be appreciated that the method 500 of FIG. 5 may sacrifice monitoring accuracy for performance as needed, so that the operation of real-time, near real-time, or mission critical distributed applications is not disrupted.

Figure 6:
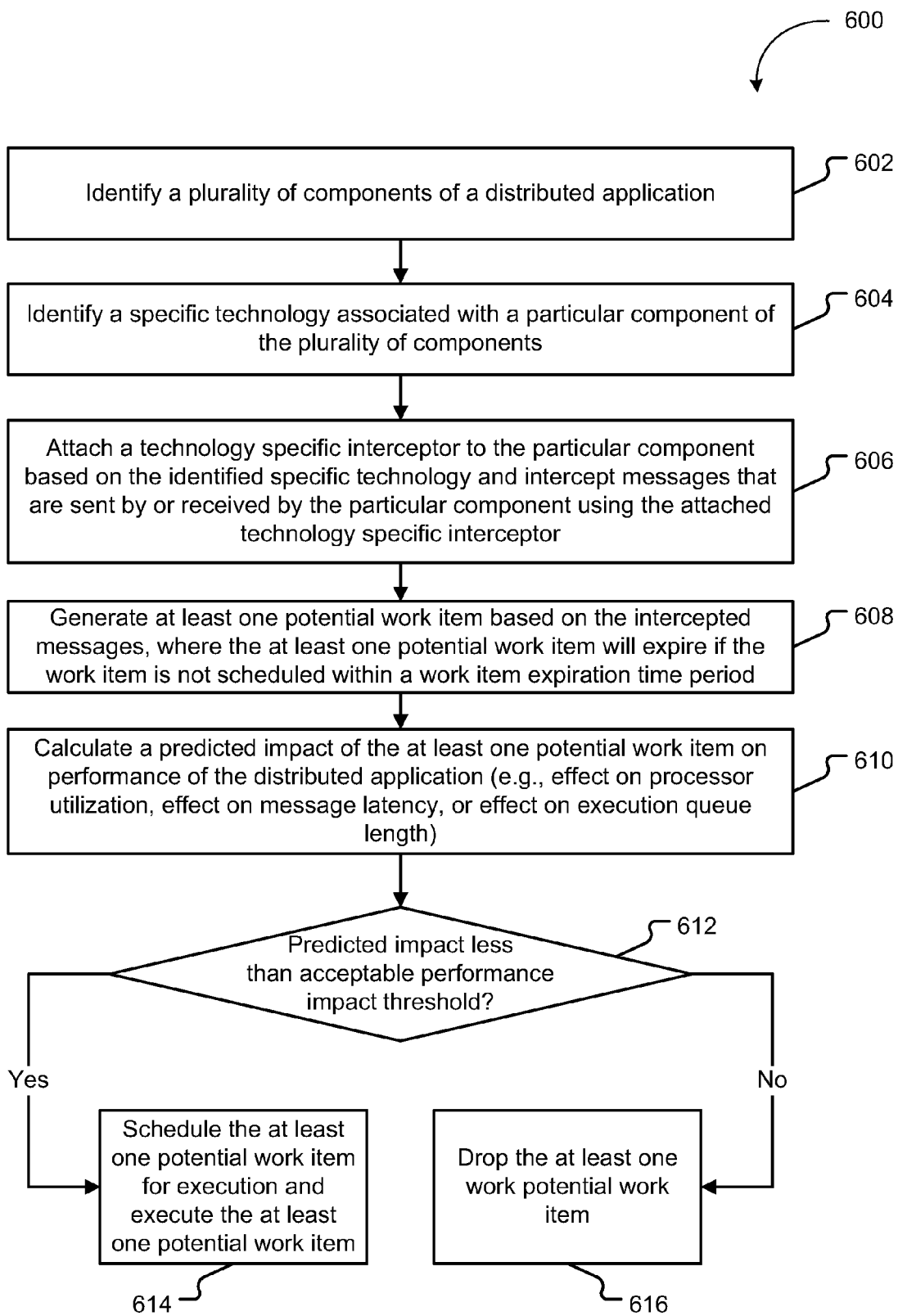
FIG. 6 is a flow diagram of another particular embodiment of a method of monitoring a distributed application.

FIG. 6 is a flow diagram of another particular embodiment of a method 600 of monitoring a distributed application. In an illustrative embodiment, the method 600 may be performed by the system 100 of FIG. 1 or the system 200 of FIG. 2. The method 600 includes identifying a plurality of components of a distributed application, at 602. For example, in FIG. 1, the technology agnostic interceptor manager 130 may identify the WCF component 110 and the .NET component 120. The method 600 also includes identifying a specific technology associated with a particular component of the plurality of components, at 604. For example, in FIG. 1, the technology agnostic interceptor manager 130 may identify that the WCF component 110 is associated with WCF technology.

The method 600 further includes attaching a technology specific interceptor to the particular component based on the identified specific technology and intercepting messages that are sent by or received by the particular component using the attached technology specific interceptor, at 606. For example, in FIG. 1, the technology interceptor manager 130 may attach the WCF interceptor 112 to the WCF component 110, and the WCF interceptor 112 may intercept messages sent by or received by the WCF component 110. The method 600 also includes generating at least one potential work item based on the intercepted messages, at 608. For example, in FIG. 1, the WCF interceptor 112 may generate at least one potential work item based on the intercepted messages and send the at least one potential work item to the technology specific interceptor manager, where the at least one potential work item is inserted in the WCF work item queue 142.

The method 600 also includes calculating a predicted impact of the at least one potential work item on performance of the distributed application, at 610. The predicted impact may be an effect on processor utilization, an effect on message latency, or an effect on execution queue length. For example, in FIG. 1, the work item scheduling logic 144 may calculate a predicted impact of the at least one potential work item, where the predicted impact is an effect on processor utilization at the distributed application 102, an effect on message latency at the distributed application 102, or an effect on execution queue length at the distributed application 102. The method 600 also includes determining whether the predicted impact is less than an acceptable performance impact threshold, at 612. For example, in FIG. 1, the work item scheduling logic 144 may determine whether the predicted performance impact of the at least one potential work item is less than an acceptable performance impact threshold.

When it is determined that the predicted impact is less than the acceptable performance impact threshold, the method includes scheduling the at least one potential work item for execution and executing the at least one potential work item, at 614. For example, when it is determined that the predicted impact is less than the acceptable performance impact threshold, the WCF work item scheduling logic 144 may schedule the at least one potential work item for execution and the at least one potential work item may be executed. When it is determined that the predicted impact is not less than the acceptable performance impact threshold, the method includes dropping the at least one potential work item, at 616. For example, when it is determined that the predicted impact is not less than the acceptable performance impact threshold, the WCF work item scheduling logic 144 may drop the at least one potential work item by deleting it from the work item queue 142 without scheduling the at least one potential work item for execution. Alternatively, in FIG. 1, the WCF work item scheduling logic 144 may allow the at least one potential work item to remain in the WCF work item queue 142, where the at least one potential work item will automatically expire.

It will be appreciated that the method 600 of FIG. 6 may be used to selectively schedule at least one potential work item for execution based on a predicted impact of the at least one potential work item on the performance of a distributed application. It will further be appreciated that work items that have a high predicted performance impact may be deleted from a work item queue, freeing space in a work item queue for subsequently received work items.

Figure 7:
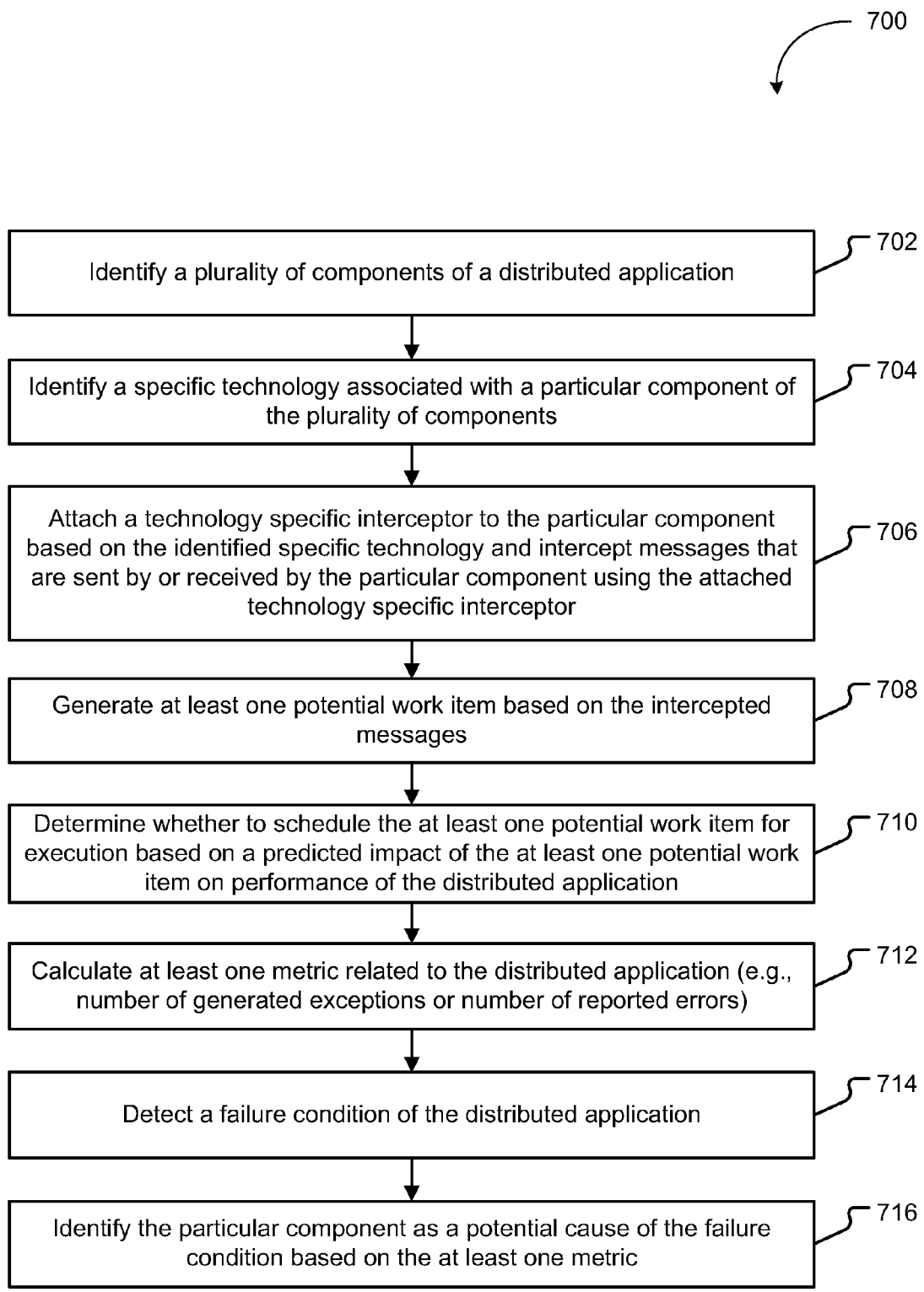
FIG. 7 is a flow diagram of a particular embodiment of a method of monitoring a distributed application.

FIG. 7 is a flow diagram of another particular embodiment of a method 700 of monitoring a distributed application. In an illustrative embodiment, the method 700 may be performed by the system 100 of FIG. 1 or the system 200 of FIG. 2. The method 700 includes identifying a plurality of components of a distributed application, at 702. For example, in FIG. 2, the technology agnostic interceptor manager 230 may identify the .NET component 205, the WCF component 206, the Java component 207, or any combination thereof. The method 700 also includes identifying a specific technology associated with a particular component of the plurality of components, at 704. For example, in FIG. 2, the technology agnostic interceptor manager 230 may identify that the WCF component 206 is associated with WCF technology.

The method 700 further includes attaching a technology specific interceptor to the particular component based on the identified specific technology and intercepting messages that are sent by or received by the particular component using the attached technology specific interceptor, at 706. For example, in FIG. 2, the technology agnostic interceptor manager 230 may attach the WCF interceptor 203 to the WCF component 206, and the WCF interceptor 203 may intercept messages sent by or received by the WCF component 206. The method 700 also includes generating at least one potential work item based on the intercepted messages, at 708. For example, the WCF interceptor 203 may generate at least one potential work item based on the intercepted messages. The method 700 also includes determining whether to schedule the at least one potential work item for execution, at 710. The determination is made based on a predicted impact of the at least one potential work item on performance of the distributed application. For example, in FIG. 2, the WCF work item scheduling logic 244 may determine whether to schedule the at least one potential work item based on a predicted impact of the at least one potential work item on the performance of the distributed application 201.

The method 700 also includes calculating at least one metric related to the distributed application, such as a number of generated exceptions or a number of reported errors, at 712. For example, in FIG. 2, the technology agnostic interceptor manager 230 may receive work items from the WCF interceptor 203 that indicate exceptions at the WCF component 206 and count a number of such work items that are received. In a particular embodiment, the exceptions may be counted by an identity monitor, such as the identity monitor 320 of FIG. 3. The method 700 further includes detecting a failure condition of the distributed application, at 714. For example, a failure condition of the distributed application 201 of FIG.

2 may be detected. The method 700 also includes identifying the particular component as a potential cause of the failure condition based on the at least one metric, at 716. For example, in FIG. 2, the WCF component 206 may be identified as a potential cause of the failure condition of the distributed application 201 based on the number of exceptions at the WCF component 206.

It will be appreciated that the method 700 of FIG. 7 may be used to monitor the components of a distributed application and to identify a particular component as a potential cause of a failure at the distributed application based on metrics generated while monitoring the particular component. Thus, the method 700 of FIG. 7 may reduce the time taken to diagnose and respond to a failure condition at the distributed application. It will further be appreciated that the metrics calculated while monitoring components of a distributed application (e.g., the number of exceptions or errors) may be used to predict and prevent a future failure event. For example, when the number of exceptions generated by a particular component increases, IT administrators may be notified of the increase in exceptions so that the IT administrators may resolve any problems at the particular component before the particular component fails.

Figure 8:
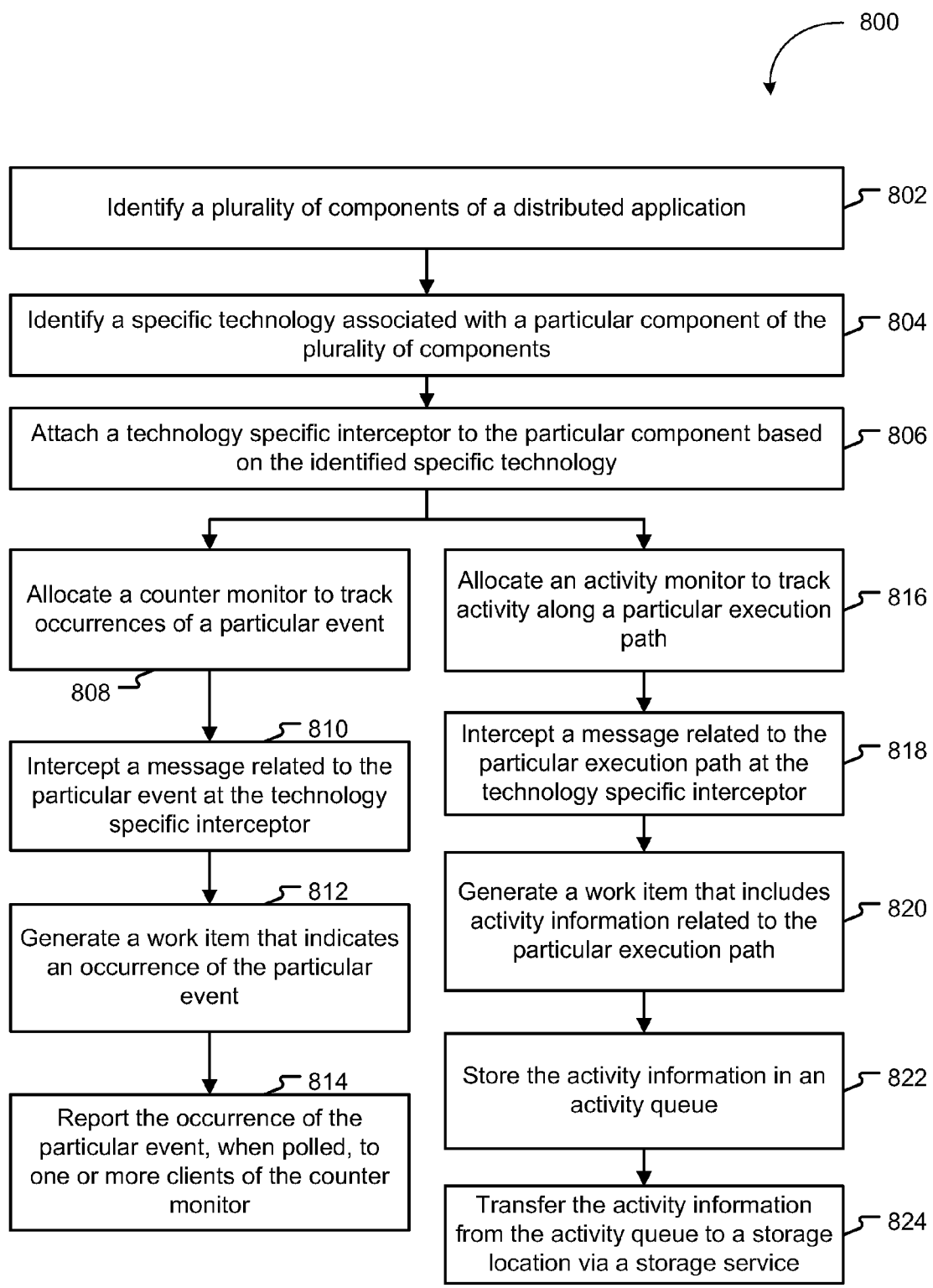
FIG. 8 is a flow diagram of another particular embodiment of a method of monitoring a distributed application.

FIG. 8 is a flow diagram of another particular embodiment of a method 800 of monitoring a distributed application. In an illustrative embodiment, the method 800 may be performed by the system 100 of FIG. 1 or the system 200 of FIG. 2. The method 800 includes identifying a plurality of components of a distributed application, at 802. For example, in FIG. 2, the technology agnostic interceptor manager 230 may identify the .NET component 205, the WCF component 206, the Java component 207, or any combination thereof. The method 800 also includes identifying a specific technology associated with a particular component of the plurality of components, at 804. For example, in FIG. 2, the technology agnostic interceptor manager 230 may identify that the WCF component 206 is associated with WCF technology.

The method 800 further includes attaching a technology specific interceptor to the particular component based on the identified specific technology, at 806. For example, in FIG. 2, the technology agnostic interceptor manager 230 may attach the WCF interceptor 203 to the WCF component 206. The method 800 includes two paths: a path for event monitoring that includes 808, 810, 812, and 814; and a path for activity monitoring that includes 816, 818, 820, 822, and 824.

In the path for event monitoring, the method 800 includes allocating a counter monitor to track occurrences of a particular event, at 808. For example, in FIG. 2, a counter monitor may be allocated to track exceptions at the WCF component 206, where the counter monitor is located in a monitoring tree of an identity monitor (e.g., one of the identity monitors 260) for the WCF component 206. In a particular embodiment, the allocated counter monitor includes the counter monitor 350 of FIG. 3. The method 800 also includes intercepting a message related to the particular event at the technology specific interceptor, at 810. For example, in FIG. 2, the WCF interceptor 203 may intercept a message indicating the occurrence of an exception at WCF component 206. The method 800 further includes generating a work item that indicates an occurrence of the particular event, at 812. For example, in FIG. 2, the WCF interceptor 203 may generate a work item indicating the occurrence of the exception at the WCF component 206. The method 800 also includes reporting the occurrence of the particular event to one or more clients of the counter monitor, at 814. In a particular embodiment, the occurrence of the particular event may be reported when the one or more clients poll the counter monitor. For example, in FIG. 2, the occurrence of the exception at the WCF component 206 may be reported to one or more clients of the identity monitor (e.g., one of the identity monitors 260) for the WCF component 206.

In the path for activity monitoring, the method 800 includes allocating an activity monitor to track activity along a particular execution path, at 816. For example, in FIG. 2, an activity business perspective monitor may be allocated to track activity along a particular execution path of the distributed application 201 that includes the WCF component 206, where the activity business perspective monitor is located in a monitoring tree of an endpoint monitor (e.g., one of the endpoint monitors 260) for the WCF component 206. In a particular embodiment, the activity business perspective monitor includes the business perspective monitor 340 of FIG. 3. The method 800 also includes intercepting a message related to the particular execution path at the technology specific interceptor, at 818. For example, in FIG. 2, the WCF interceptor 203 may intercept a message indicating activity along the particular execution path of the distributed application 201. The method 800 further includes generating a work item that includes activity information related to the particular execution path, at 820. For example, the WCF interceptor 203 of FIG. 2 may generate a work item that includes activity information related to the particular execution path. The method 800 also includes storing the activity information in an activity queue, at 822, and transferring the activity information from the activity queue to a storage location via a storage service, at 824. For example, in FIG. 2, the activity manager 270 may store the activity information in the activity queue 280 and may subsequently transfer the activity information from the activity queue 280 to a storage location via the storage service 290.

It will be appreciated that the method 800 of FIG. 8 may be used to monitor events such as exceptions and errors that may occur in a distributed application. It will further be appreciated that the method 800 of FIG. 8 may also be used to track activity along a particular execution path of a distributed application. For example, the method 800 of FIG. 8 may be used by IT administrators to trace activity along an execution path of the distributed application that is performing erroneously or inefficiently.

Figure 9:
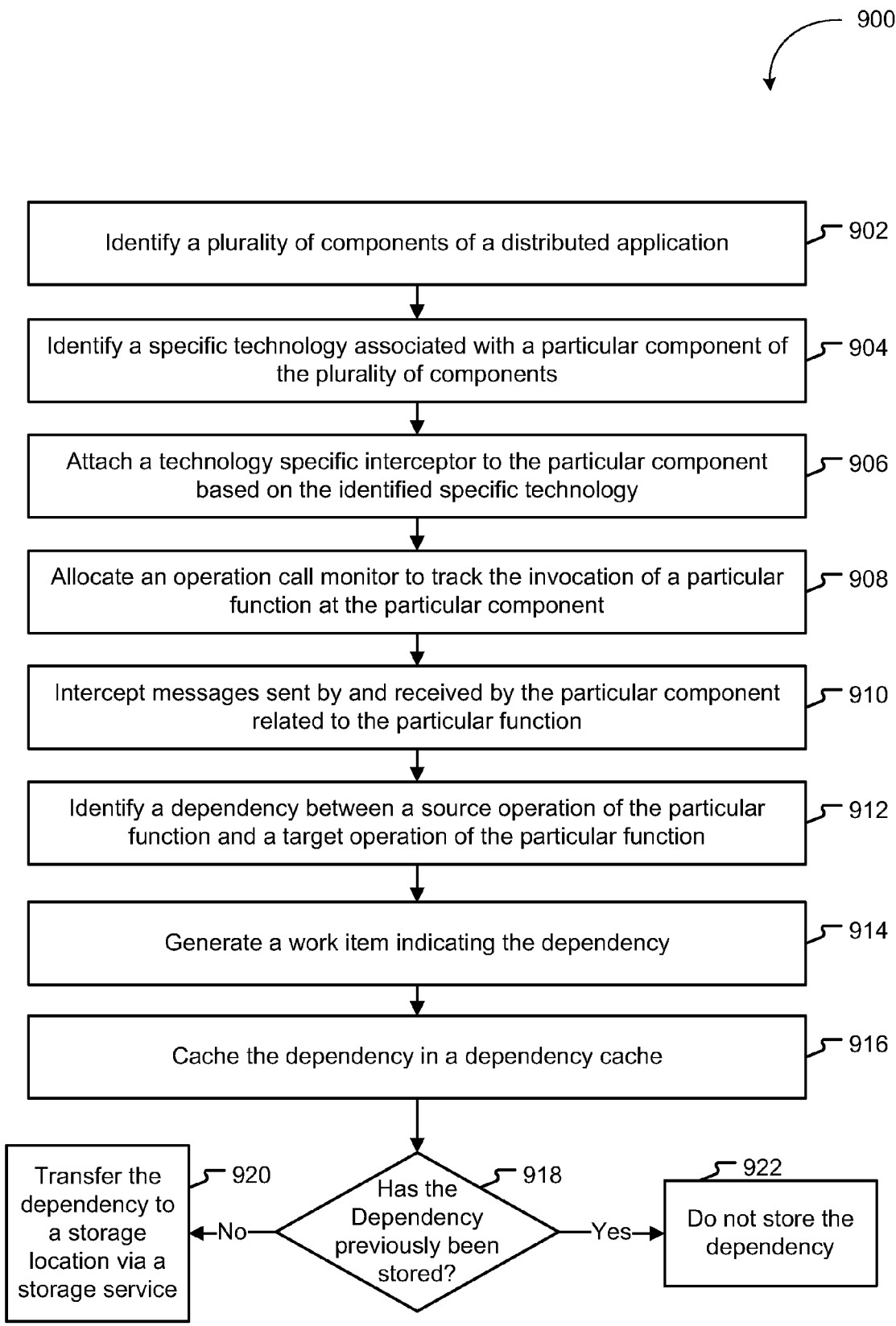
FIG. 9 is a flow diagram of another particular embodiment of a method of monitoring a distributed application.

FIG. 9 is a flow diagram of another particular embodiment of a method 900 of monitoring a distributed application. In an illustrative embodiment, the method 900 may be performed by the system 100 of FIG. 1 or the system 200 of FIG. 2. The method 900 includes identifying a plurality of components of a distributed application, at 902. For example, in FIG. 2, the technology agnostic interceptor manager 230 may identify the .NET component 205, the WCF component 206, the Java component 207, or any combination thereof. The method 900 also includes identifying a specific technology associated with a particular component of the plurality of components, at 904. For example, in FIG. 2, the technology agnostic interceptor manager 230 may identify that the WCF component 206 is associated with WCF technology.

The method 900 further includes attaching a technology specific interceptor to the particular component based on the identified specific technology, at 906. For example, in FIG. 2, the technology agnostic interceptor manager 230 may attach the WCF interceptor 203 to the WCF component 206. The method 900 also includes allocating an operation call monitor to track the invocation of a particular function at the particular component, at 908. For example, an operation call monitor may be allocated to track the invocation of a particular function at the WCF component 206, where the operation call monitor is located in a monitoring tree of an endpoint monitor (e.g., one of the endpoint monitors 260) for the WCF component 206. In a particular embodiment, the allocated operation call monitor may include the operation call target endpoint monitor 370 of FIG. 3.

The method 900 includes intercepting messages sent by and received by the particular component related to the particular function, at 910. For example, in FIG. 2, the WCF interceptor 203 may intercept messages sent by and received by the WCF component 206, where the intercepted messages are related to the particular function. The method 900 also includes identifying a dependency between a source operation of the particular function and a target operation of the particular function, at 912. For example, in FIG. 2, the WCF interceptor 203 may identify a dependency between a source operation of the particular function and the target operation of the particular function. In a particular embodiment, the source operation and the target operation are located at different components of the distributed application 201 (e.g., the source operation is located at the WCF component 206 and the target operation is located at the .NET component 205).

The method 900 further includes caching the dependency in a dependency cache, at 916. For example, in FIG. 2, the dependency manager 272 may cache the dependency in the dependency cache 282. The method 900 also includes determining whether the dependency has previously been stored, at 918. For example, the dependency manager 272 of FIG. 2 may determine whether the dependency has previously been stored.

When the dependency has not previously been stored, the method 900 includes transferring the dependency to a storage location via a storage service, at 920. For example, in FIG. 2, when the dependency manager 272 may transfer the dependency from the dependency cache 282 to a storage location via the storage service 290. When it is the dependency has previously been stored, the method 900 includes not storing the dependency, at 922. For example, in FIG. 2, the dependency manager 272 may delete the dependency from the dependency cache 282 without storing the dependency.

It will be appreciated that the method 900 of FIG. 9 may be used to discover dependencies between various source operations and target operations in a distributed application, including inter-component dependencies. It will further be appreciated that the method 900 of FIG. 9 may reduce the performance impact of such dependency discovery by only storing discovered dependencies that have not previously been stored.

Figure 10:
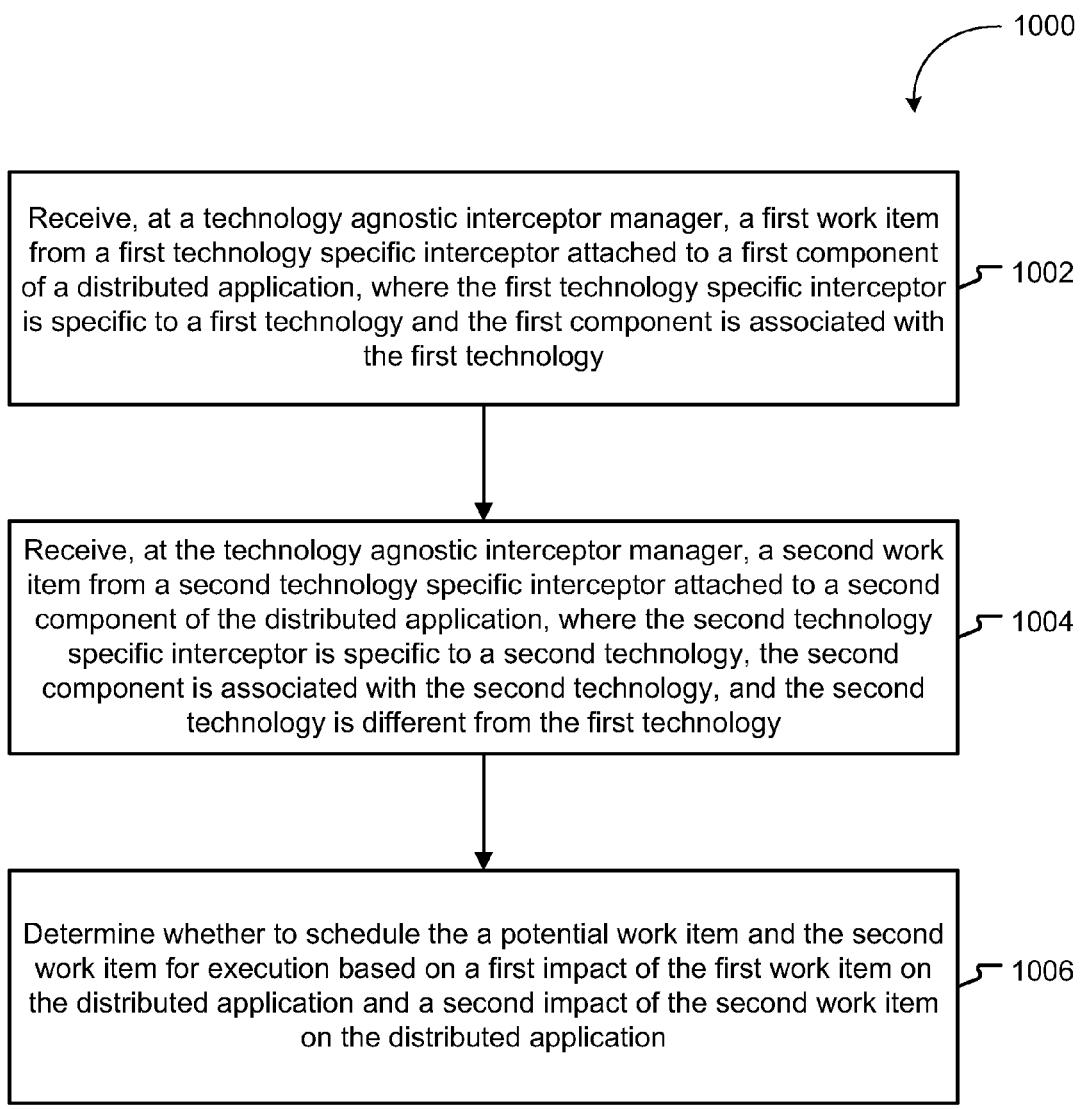
FIG. 10 is a flow diagram of a particular embodiment of a method of selectively scheduling work items at a technology agnostic interceptor manager.

FIG. 10 is a flow diagram of a particular embodiment of a method 1000 of selectively scheduling work items at a technology agnostic interceptor manager. In an illustrative embodiment, the method 1000 may be performed by the technology agnostic interceptor manager 130 of FIG. 1 or the technology agnostic interceptor manager 230 of FIG. 2. The method 100 includes receiving, at a technology agnostic interceptor manager, a first work item from a first technology specific interceptor attached to a first component of a distributed application, at 1002. The first technology specific interceptor is specific to a first technology, and the first component is associated with the first technology. For example, in FIG. 1, the technology agnostic interceptor manager 130 may receive a first work item from the WCF interceptor 112 attached to the WCF component 110 in the distributed application 102.

The method 1000 also includes receiving, at the technology agnostic interceptor manager, a second work item from a second technology specific interceptor attached to a second component of the distributed application, at 1004. The second technology interceptor is specific to a second technology, the second component is associated with the second technology, and the second technology is different from the first technology. For example, in FIG. 1, the technology agnostic interceptor manager 130 may receive a second work item from the .NET interceptor 122 attached to the .NET component 120 in the distributed application 102.

The method 1000 further includes determining whether to schedule the first work item and the second work item for execution, at 1006. The determination is made based on a first impact of the first work item on the distributed application and based on a predicted impact of the second work item on the distributed application. For example, in FIG. 1, the WCF work item scheduling logic 144 may determine whether to schedule the first work item based on a first impact of the first work item on the distributed application 102, and the .NET work item scheduling logic 154 may determine whether to schedule the second work item based on a second impact of the second work item on the distributed application 102.

It will be appreciated that the method 1000 of FIG. 10 may be used by a technology agnostic interceptor manager (e.g., the technology agnostic interceptor manager 130 of FIG. 1 or the technology agnostic interceptor manager 230 of FIG. 2) to selectively schedule work items for execution based on the predicted impact of the work items. It will thus be appreciated that the method 1000 of FIG. 10 may be used by a technology agnostic interceptor manager to avoid disrupting the regular performance of a real-time, near real-time, or mission critical distributed application. The technology agnostic interceptor manager may not schedule work items with high predicted impacts on the real-time, near real-time, or mission critical distributed application.

Figure 11:
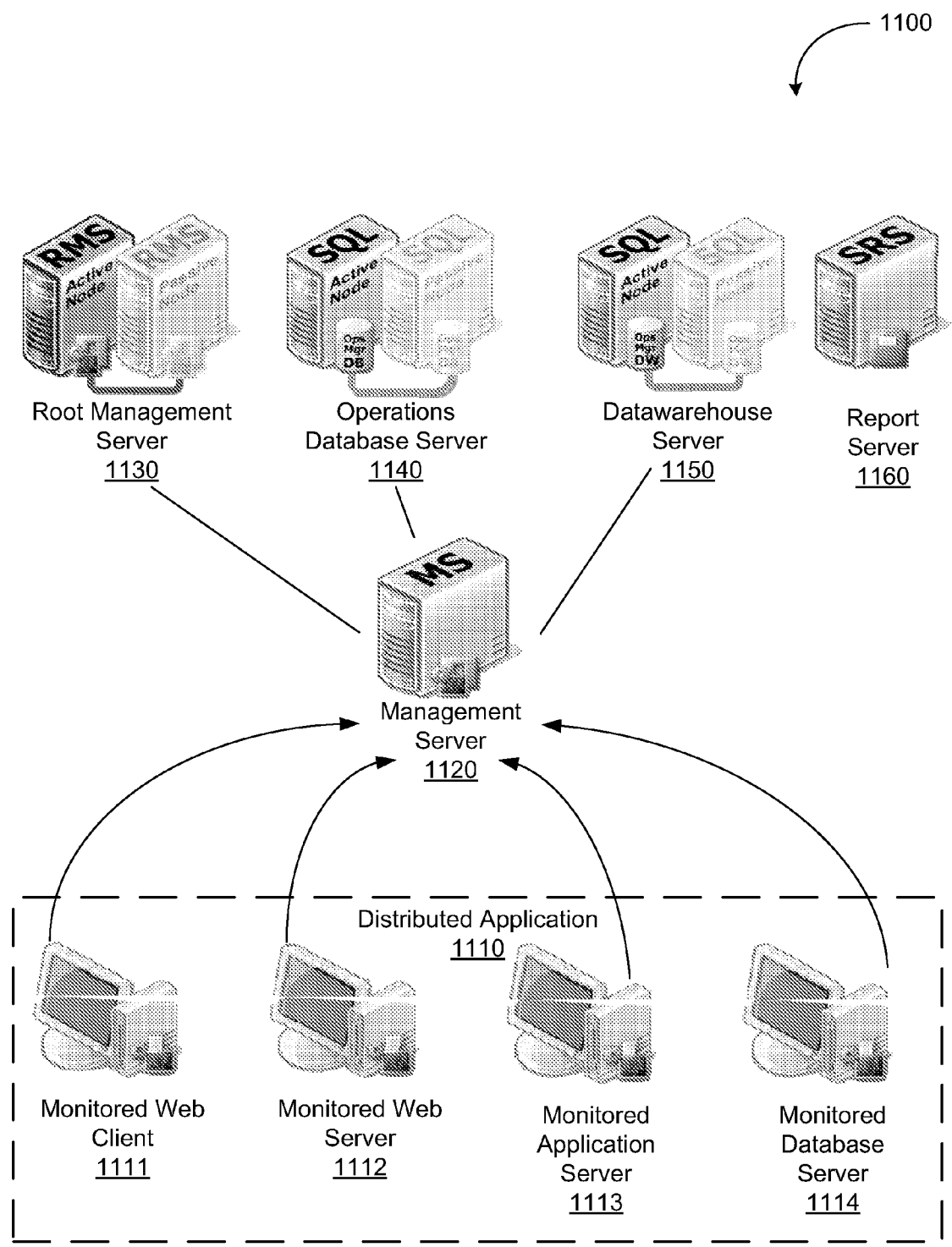
FIG. 11 is a general diagram to illustrate a particular embodiment of a distributed computing environment.

FIG. 11 is a general diagram to illustrate a particular embodiment of a distributed computing environment 1100. The distributed computing environment 1100 may include a distributed application 1110 that includes one or more monitored application components, such as a monitored web client 1111, a monitored web server 1112, a monitored application server 1113, and a monitored database server 1114. The distributed computing environment 1100 may also include a management server 1120 communicatively coupled to the components of the distributed application 1110 and a root management server 1130, an operations database server 1140, and a datawarehouse server 1150. In a particular embodiment, the distributed computing environment 1100 also includes a report server 1160 configured to generate monitoring reports for the distributed application 1110. In an illustrative embodiment, the distributed application 1110 may include the distributed application 102 of FIG. 1 or the distributed application 201 of FIG. 2.

The management server 1120 includes a technology agnostic interceptor manager, such as the technology agnostic interceptor manager 130 of FIG. 1 or the technology agnostic interceptor manager 230 of FIG. 2. The management server 1120 may also communicate with the root management server 1130. The management server 1120 may store and retrieve information, such as dependency data and activity data, from the operations database server 1140 and the datawarehouse server 1150. In a particular embodiment, the management server 1120 is configured to generate monitoring reports that include discovery data and dependency data via the report server 1160.

In operation, the monitored web client 1111, the monitored web server 1112, the monitored application server 1113, and the monitored database server 1114 may be monitored by one or more attached technology specific interceptors. The technology specific interceptors may generate and send work items to the technology agnostic interceptor manager at the management server 1120. The technology agnostic interceptor manager at the management server 1120 may then selectively scheduled the received work items for execution based on a predicted impact on the distributed application 1110 or based on a predicted impact on a particular distributed application component (e.g., one of the components 1111-1114).

It will be appreciated that the management server 1120 may monitor function call invocations, activity, and events at different types of distributed application components (e.g., web clients, web servers, application servers, and database servers).

Figure 12:
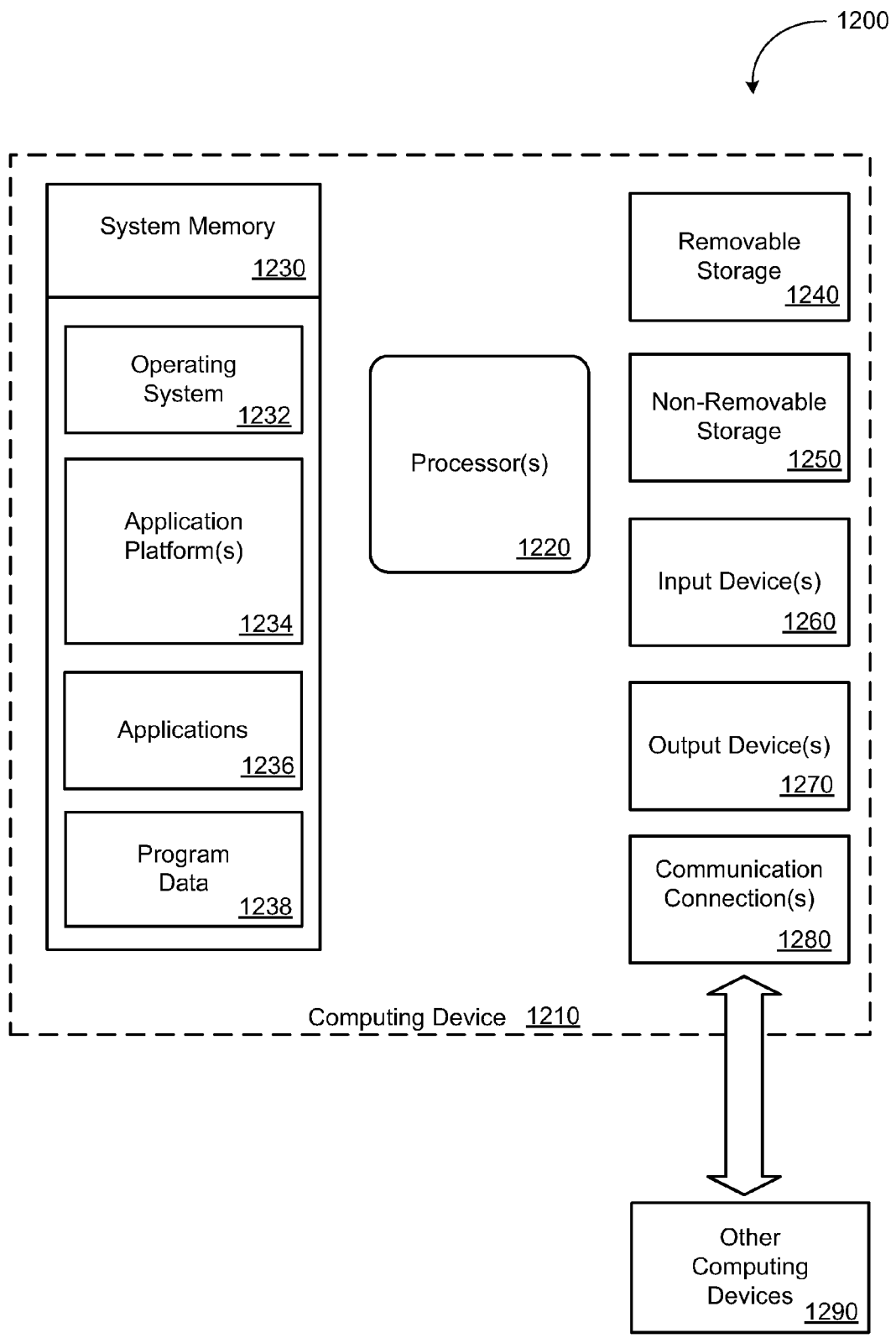
FIG. 12 is a block diagram of a computing environment including a computing device operable to support embodiments of computer-implemented methods, computer program products, and system components as illustrated in FIGS. 1-11.

FIG. 12 shows a block diagram of a computing environment 1200 including a computing device 1210 operable to support embodiments of computer-implemented methods, computer program products, and system components according to the present disclosure.

The computing device 1210 typically includes at least one processor 1220 and system memory 1230. Depending on the exact configuration and type of computing device, the system memory 1230 may be volatile (such as random access memory or "RAM"), non-volatile (such as read-only memory or "ROM," flash memory, and similar memory devices that maintain data stored even when power is not provided) or some combination of the two. The system memory 1230 typically includes an operating system 1232, one or more application platforms 1234, one or more applications 1236, and may include program data 1238. For example, the system memory 1230 may include one or more components of a distributed application, such as the WCF component 110 of FIG. 1, the WCF component 206 of FIG. 2, the .NET component 120 of FIG. 1, the .NET component 205 of FIG. 2, or the Java component 207 of FIG. 2. When the computing device 1210 includes a component, the computing device 1210 may also include one or more technology specific interceptor attached to the component. For example, the computing device 1210 may include the WCF interceptor 112 of FIG. 1, the WCF interceptor 203 of FIG. 2, the .NET interceptor 122 of FIG. 1, the .NET interceptor 202 of FIG. 2, or the Java interceptor 204 of FIG. 2. As another example, the system memory 1230 may include the technology agnostic interceptor manager 130 of FIG. 1 or the technology agnostic interceptor manager 230 of FIG. 2.

In a particular embodiment, a distributed application (e.g., the distributed application 102 of FIG. 1 or the distributed application 201 of FIG. 2) may include multiple computing devices (e.g., the computing device 1210), and each such computing device may include one or more components of the distributed application.

The computing device 1210 may also have additional features or functionality. For example, the computing device 1210 may also include removable and/or non-removable additional data storage devices such as magnetic disks, optical disks, tape, and standard-sized or miniature flash memory cards. Such additional storage is illustrated in FIG. 12 by removable storage 1240 and non-removable storage 1250. Computer storage media may include volatile and/or non-volatile storage and removable and/or non-removable media implemented in any method or technology for storage of information such as computer-readable instructions, data structures, program components or other data. The system memory 1230, the removable storage 1240, and the non-removable storage 1250 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store the desired information and that can be accessed by the computing device 1210. Any such computer storage media may be part of the computing device 1210. The computing device 1210 may also have input device(s) 1260, such as a keyboard, mouse, pen, voice input device, touch input device, etc. Output device(s) 1270, such as a display, speakers, printer, etc. may also be included.

The computing device 1210 also contains one or more communication connections 1280 that allow the computing device 1210 to communicate with other computing devices 1290, such as one or more client computing systems or other servers, over a wired or a wireless network. For example, the one or more communication connections 1280 may include the network interfaces 512 or 542 of FIG. 5. The one or more communication connections 1280 are an example of communication media. By way of example, and not limitation, communication media may include wired media such as a wired network or direct-wired connection, and wireless media such as acoustic, RF, infrared and other wireless media. It will be appreciated, however, that not all of the components or devices illustrated in FIG. 12 or otherwise described in the previous paragraphs are necessary to support embodiments as herein described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A monitoring method comprising:
   identifying, by a monitoring system, a plurality of components of a distributed application including a first component associated with a first technology at a first computing device and a second component associated with a second technology at a second computing device, wherein the first technology is different from the second technology;
   attaching, by the monitoring system, a first technology specific interceptor to the first component based on the associated first technology and intercepting messages that are sent by or received by the first component using the first technology specific interceptor;
   attaching, by the monitoring system, a second technology specific interceptor to the second component based on the associated second technology and intercepting messages that are sent by or received by the second component using the second technology specific interceptor;
   wherein the first technology specific interceptor and the second technology specific interceptor are distinct; and
   in response to detecting a particular intercepted message:
      generating at least one potential work item based on the particular intercepted message; and
      determining whether to schedule the at least one potential work item based on a predicted impact of the at least one potential work item on performance of the distributed application and determining whether to drop the at least one potential work item without scheduling the at least one potential work item in response to determining that the predicted impact of the at least one potential work item on performance of the distributed application is greater than an acceptable performance impact threshold;
   wherein the at least one potential work item is scheduled for execution when the predicted impact of the at least one potential work item on performance is below the acceptable performance impact threshold, and wherein the at least one potential work item is not scheduled for execution when the predicted impact of the at least one potential work item is above the acceptable performance impact threshold.

2. The method of claim 1, wherein the predicted impact of the at least one potential work item indicates an effect on processor utilization at the distributed application, message latency at the distributed application, execution queue length at the distributed application, or any combination thereof.

3. The method of claim 1, wherein the determining of whether to schedule the at least one potential work item includes scheduling based on one or more throttling capabilities.

4. The method of claim 1, wherein the at least one potential work item includes instructions to store discovered dependency information related to the first component and the second component, instructions to store monitored activity information related to at least one of the first component or the second component, instructions to report performance counter information related to at least one of the first component or the second component, or any combination thereof.

5. The method of claim 1, comprising allocating an operation call monitor to track an invocation of a particular function at the first component.

6. The method of claim 5, wherein the particular function has a source operation and a target operation and wherein at least one of the source operation or the target operation is associated with the second component, wherein the at least one potential work item indicates a dependency between the source operation and the target operation.

7. The method of claim 6, further comprising transferring the dependency from a dependency cache to a storage location via a storage service in response to determining that the dependency has not previously been stored.

8. The method of claim 1, further comprising allocating an activity monitor to track activity of a particular execution path at the first component, wherein the at least one potential work item includes activity information related to the particular execution path.

9. The method of claim 1, further comprising allocating a counter monitor to track occurrences of a particular event based on the intercepted messages, wherein the at least one potential work item indicates at least one occurrence of the particular event.

10. The method of claim 1, further comprising:
    calculating at least one metric related to the distributed application, wherein the at least one metric includes a number of generated exceptions, a number of reported errors, or any combination thereof;
    detecting a failure condition of the distributed application; and
    identifying the first component as a potential cause of the failure condition based on the at least one metric.

11. The method of claim 1, wherein the monitoring system receives a request for an empty work item from the first or second technology specific interceptor and refuses the request for the empty work item.

12. The method of claim 1, wherein the monitoring system is configured to turn on or turn off dependency discovery at the first or second technology specific interceptor.

13. The method of claim 1, wherein the particular intercepted message is indicative of a dependency between a source operation at the first component and a target operation at a second component of the plurality of components, and wherein the at least one potential work item includes a work item to store the dependency.

14. The method of claim 1, wherein the particular intercepted message indicates activity information related to an execution path of the distributed application and) the at least one potential work item includes a work item to store the activity information.

15. The method of claim 1, wherein the particular intercepted message indicates a software exception occurrence and the at least one potential work item includes a work item to report the occurrence of the software exception.

16. A monitoring system comprising:
a plurality of technology specific interceptors including a first technology specific interceptor associated with a first technology component of a distributed application located at a first computing device and a second technology specific interceptor associated with a second technology component of the distributed application located at a second computing device, wherein the first technology component is associated with a first technology and the second technology component is associated with a second technology and where the first technology is a different technology from the second technology, the first technology specific interceptor and the second technology specific interceptor are distinct and the first computing device is different from the second computing device, and wherein the monitoring system associates the first technology specific interceptor to the first technology component based on the first technology and associates the second technology specific interceptor to the second technology component based on the second technology; and
a technology agnostic interceptor manager at a third computing device;
wherein the first technology specific interceptor is configured to:
track operation of a first distributed application component of the distributed application, the first distributed application component associated with the first technology, including intercepting messages sent by and received by the first distributed application component;
generate work items responsive to detecting the intercepted messages based on the tracked operation of the first distributed application component; and
send the work items based on the tracked operation of the first distributed application component to the technology agnostic interceptor manager;
wherein the second technology specific interceptor is configured to:
track operation of a second distributed application component of the distributed application, the second distributed application component associated with the second technology, including intercepting messages sent by and received by the second distributed application component;
generate work items based on the tracked operation of the second distributed application component; and
send the work items based on the tracked operation of the second distributed application component to the technology agnostic interceptor manager; and
wherein the technology agnostic interceptor manager includes a plurality of work item managers, including a first work item manager associated with the first technology specific interceptor and a second work item manager associated with the second technology specific interceptor;
wherein each work item manager is associated with a particular technology specific interceptor and is configured to:
receive work items from the particular technology specific interceptor;
queue the received work items in a work item queue;
compare an impact of a particular work item on performance of the distributed application to an acceptable performance impact threshold of the distributed application;
schedule the particular work item for execution when the impact is less than the acceptable performance impact threshold; and
drop the particular work item without scheduling the particular work item for execution when the impact is greater than the acceptable performance impact threshold.

17. The system of claim 16, wherein each technology specific interceptor is further configured to request an empty work item from its associated work item manager, to generate a work item by storing information in the empty work item, and to send the generated work item to the technology agnostic interceptor manager.

18. The system of claim 16, wherein each of the work item managers is further configured to:
limit a number of concurrently executing work items;
limit a size of the work item queue;
reject work items that are received when the work item queue is full;
schedule a particular work item for execution in a foreground thread of a thread pool or in a background thread of the thread pool; and
limit a number of concurrently executing threads of the thread pool.

19. The system of claim 16, wherein the technology agnostic interceptor manager includes one or more monitors allocated by the plurality of technology specific interceptors, wherein the monitors include an identity monitor, an endpoint monitor, a component monitor, an activity monitor, a business perspective monitor, an operation call monitor, a counter monitor, an instrument monitor, or any combination thereof, and wherein the technology agnostic interceptor manager further includes a garbage collector.

* * * * *